United States Patent
Ishihara

(10) Patent No.: US 7,057,781 B2
(45) Date of Patent: Jun. 6, 2006

(54) OPTICAL SCANNING APPARATUS AND IMAGE FORMING APPARATUS USING THE SAME

(75) Inventor: Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/133,396

(22) Filed: May 20, 2005

(65) Prior Publication Data

US 2005/0206988 A1    Sep. 22, 2005

Related U.S. Application Data

(62) Division of application No. 10/385,855, filed on Mar. 12, 2003, now Pat. No. 6,965,465, which is a division of application No. 09/861,721, filed on May 22, 2001, now Pat. No. 6,590,688.

(30) Foreign Application Priority Data

May 25, 2000 (JP) ............................. 2000-154681
Apr. 27, 2001 (JP) ............................. 2001-132474

(51) Int. Cl.
*G02B 26/08* (2006.01)

(52) U.S. Cl. .................... 359/207; 359/216; 347/259

(58) Field of Classification Search .................... None
See application file for complete search history.

(56) References Cited

U.S. PATENT DOCUMENTS

| | | | |
|---|---|---|---|
| 5,015,050 A | 5/1991 | Itabashi | 359/216 |
| 5,541,760 A | 7/1996 | Iizuka | 359/207 |
| 5,995,131 A | 11/1999 | Fujibayashi et al. | 347/258 |
| 6,075,638 A | 6/2000 | Masuda | 359/206 |
| 6,133,935 A | 10/2000 | Fujibayashi et al. | 347/258 |
| 6,256,133 B1 | 7/2001 | Suzuki et al. | 359/207 |
| 6,509,995 B1 | 1/2003 | Suzuki et al. | 359/196 |
| 6,542,278 B1 * | 4/2003 | Kato | 359/205 |
| 6,556,332 B1 | 4/2003 | Ishihara | 359/205 |
| 6,563,624 B1 | 5/2003 | Ishihara | 359/205 |

FOREIGN PATENT DOCUMENTS

| | | |
|---|---|---|
| EP | 1 096 290 A2 | 5/2001 |
| JP | 4-60608 | 2/1992 |
| JP | 5-5852 | 1/1993 |
| JP | 7-181374 | 7/1995 |
| JP | 7-318796 | 12/1995 |
| JP | 9-265041 | 10/1997 |
| JP | 10-232346 | 9/1998 |
| JP | 10-333069 | 12/1998 |

* cited by examiner

*Primary Examiner*—James Phan
(74) *Attorney, Agent, or Firm*—Fitzpatrick, Cella, Harper & Scinto

(57) ABSTRACT

An optical scanning apparatus includes an incidence optical system for causing a beam emitted from a light source to be incident on a deflector, and a scanning optical system for causing the beam reflected and deflected by the deflector to be imaged on a surface to be scanned. The scanning optical system has a first lens on the deflector side and a second lens on the surface to be scanned side. The first lens has positive power in the main scanning direction and has negative power in the sub scanning direction. The power of the first lens in the main scanning direction is greater than the power of the second lens in the main scanning direction, and the second lens has positive power in the sub scanning direction.

14 Claims, 20 Drawing Sheets

FIG. 2
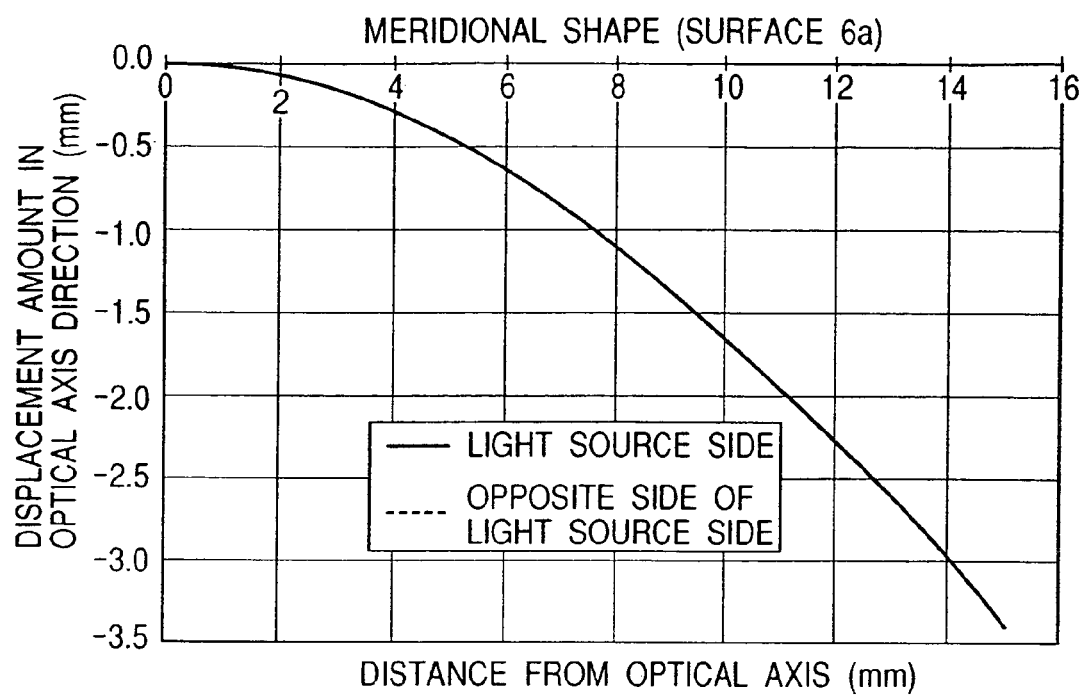
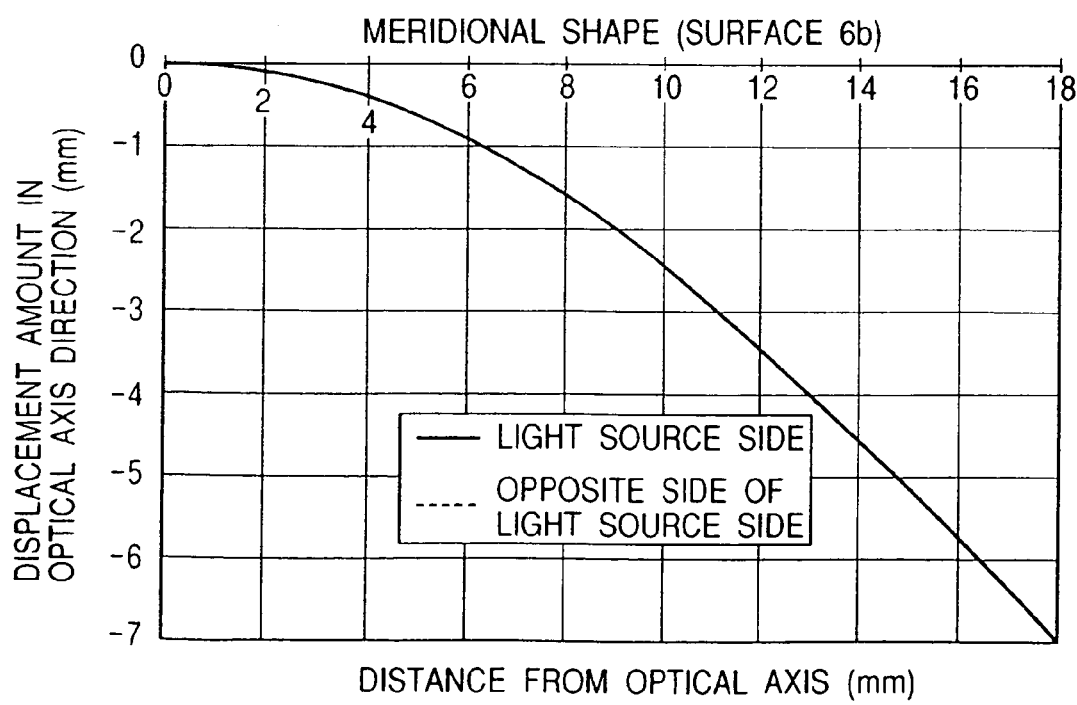

FIG. 3
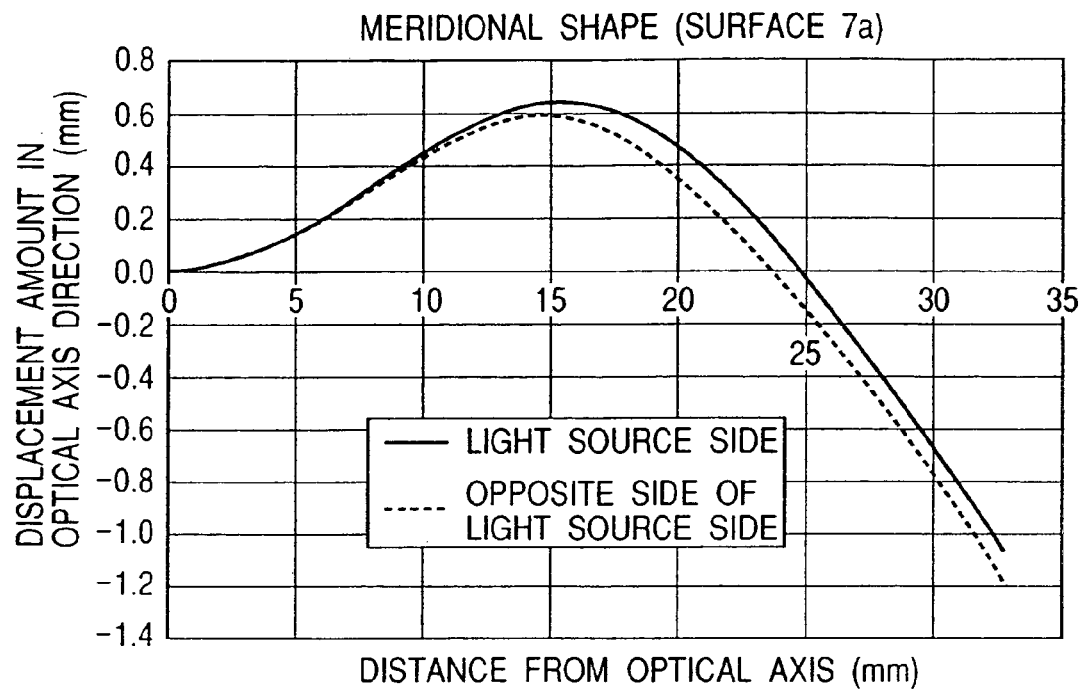
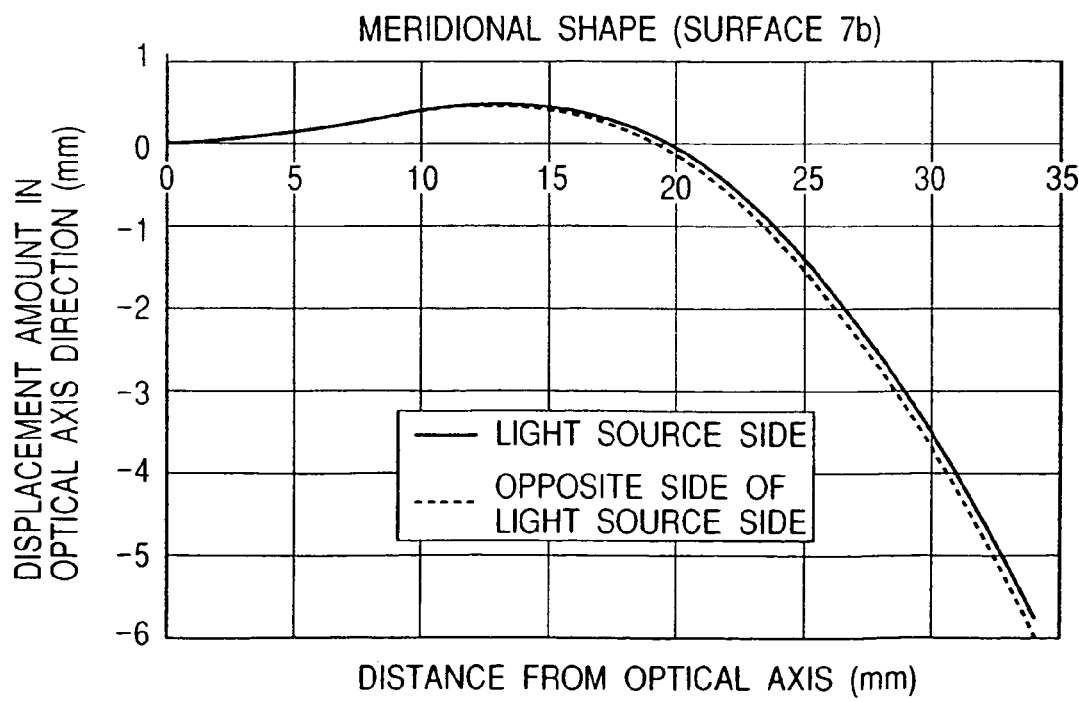

FIG. 8
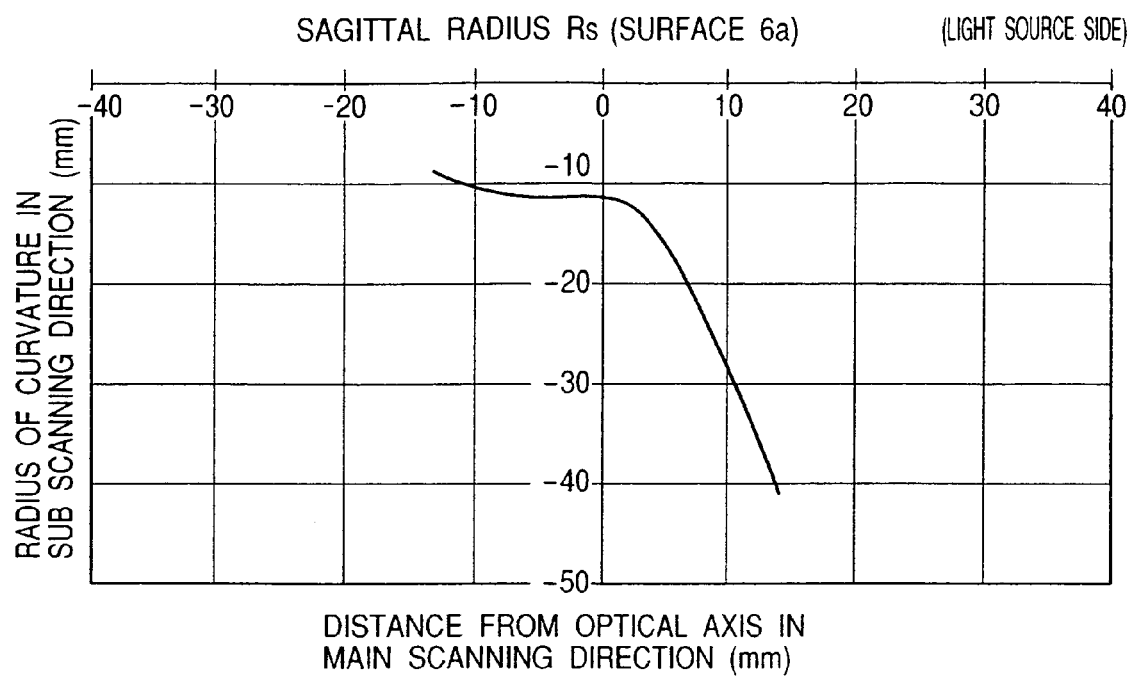
SAGITTAL RADIUS Rs (SURFACE 6a)    (LIGHT SOURCE SIDE)
DISTANCE FROM OPTICAL AXIS IN MAIN SCANNING DIRECTION (mm)
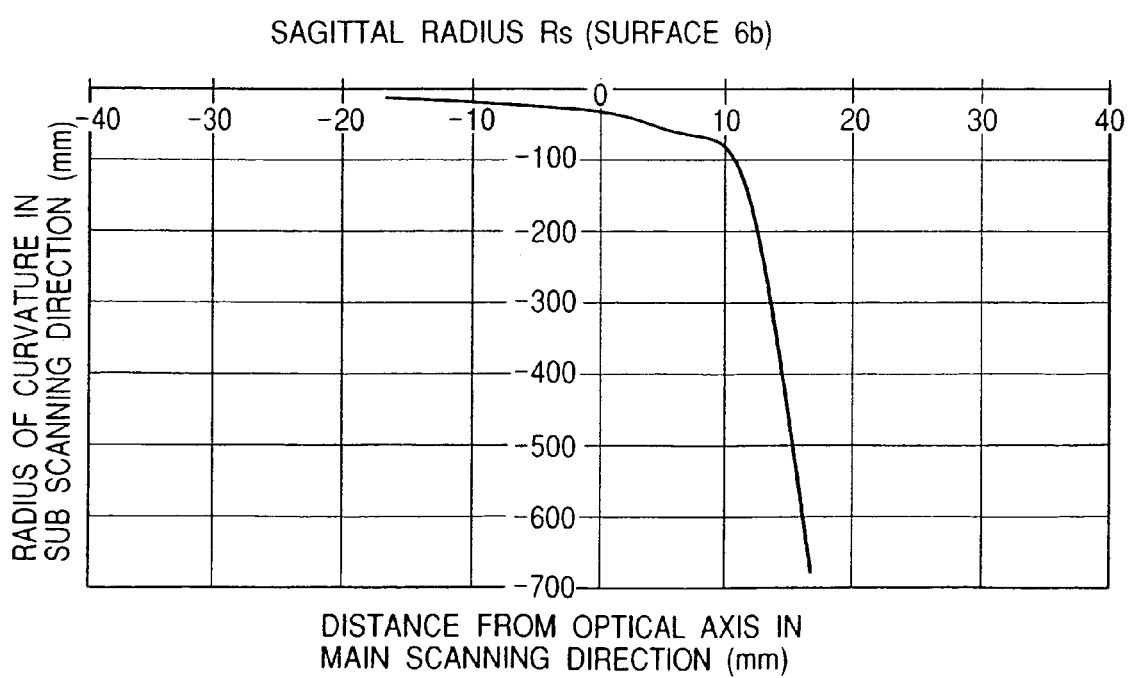
SAGITTAL RADIUS Rs (SURFACE 6b)
DISTANCE FROM OPTICAL AXIS IN MAIN SCANNING DIRECTION (mm)

FIG. 9
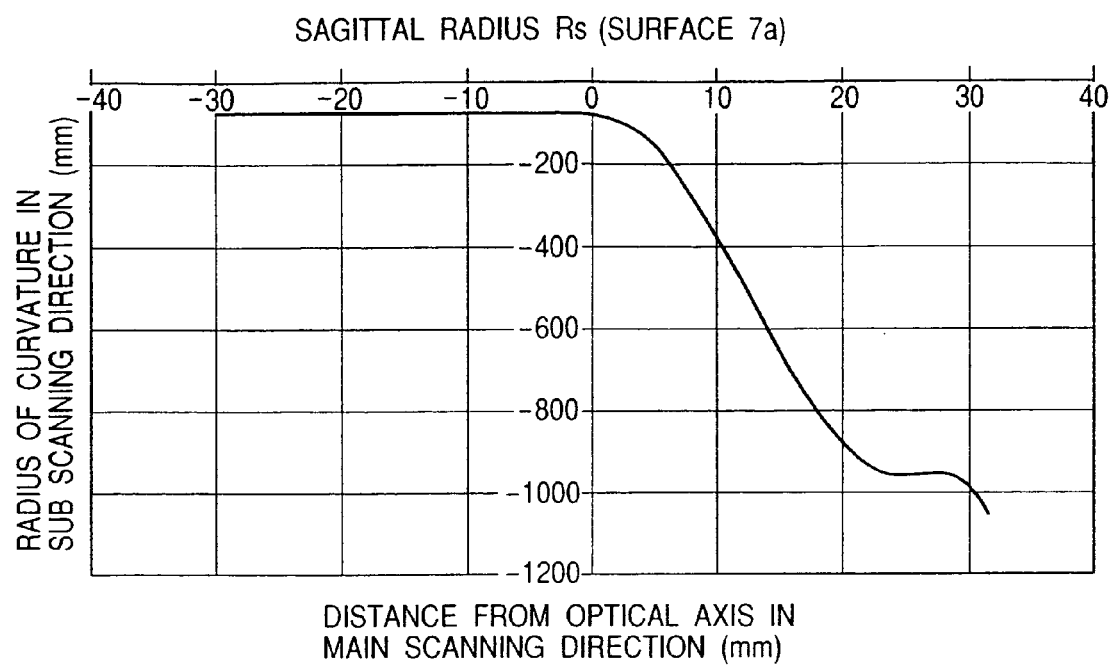
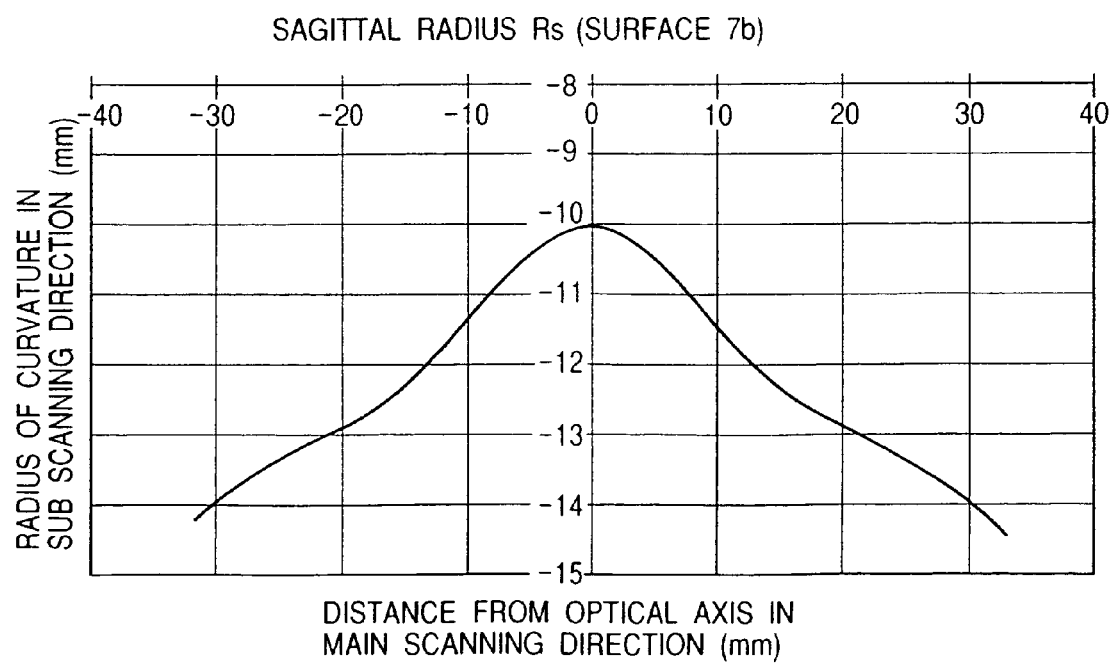

FIG. 12
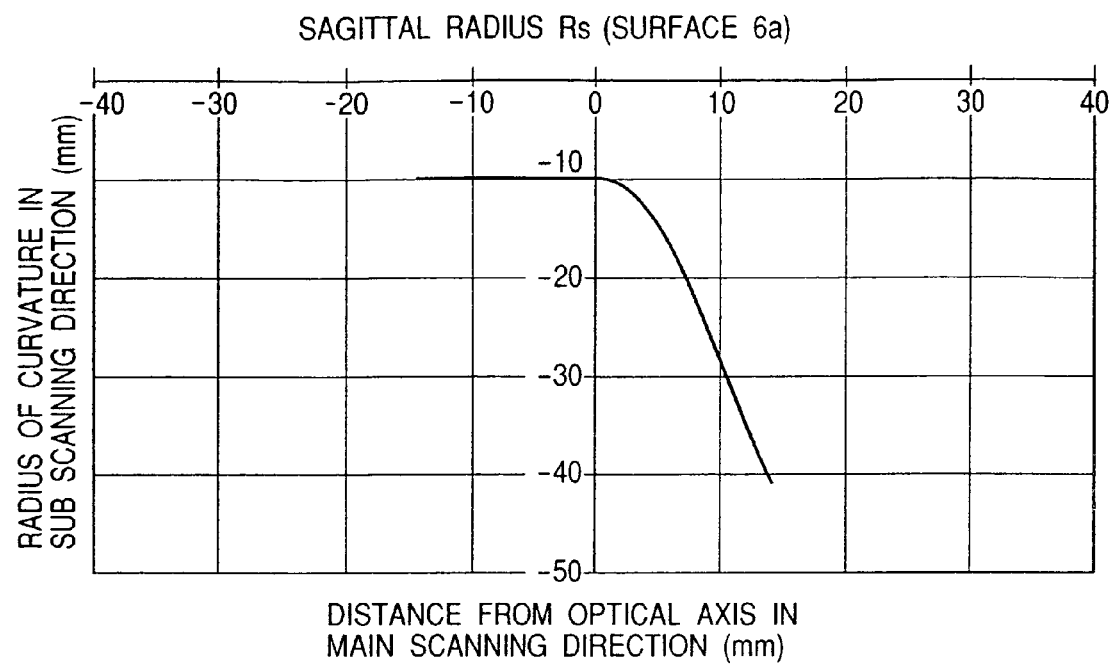
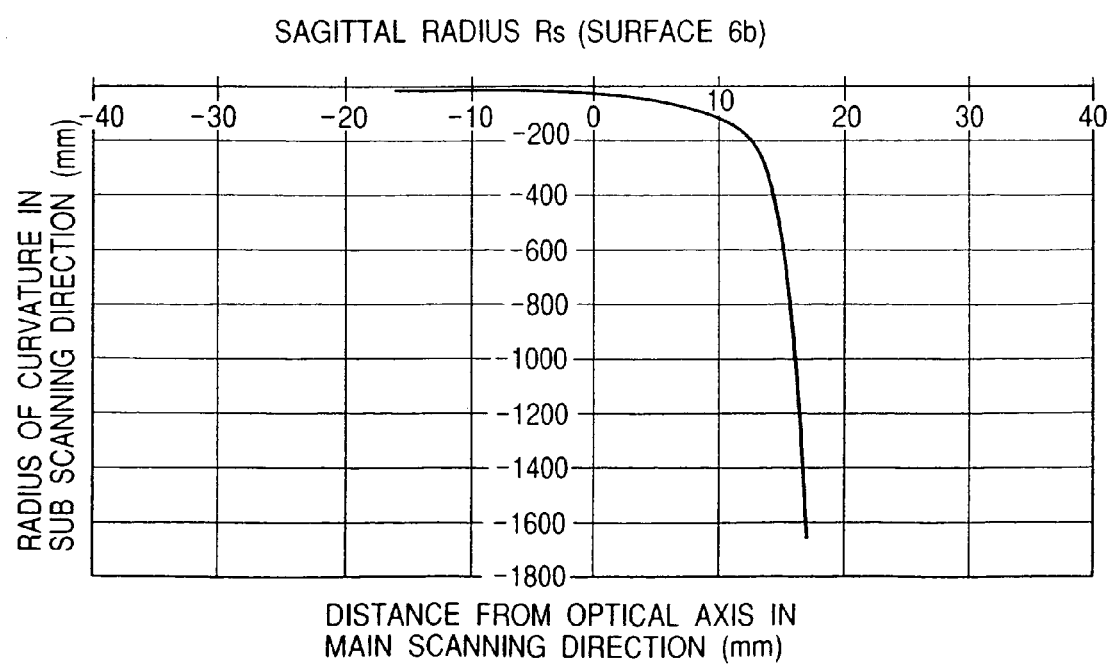

FIG. 13
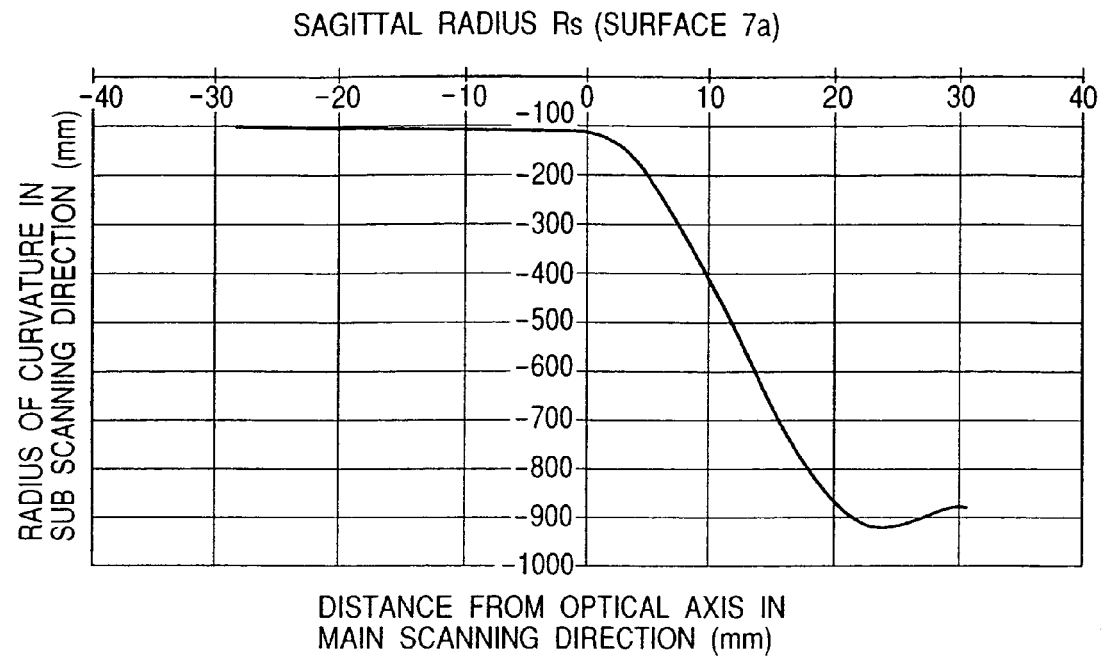
SAGITTAL RADIUS Rs (SURFACE 7a)
DISTANCE FROM OPTICAL AXIS IN
MAIN SCANNING DIRECTION (mm)
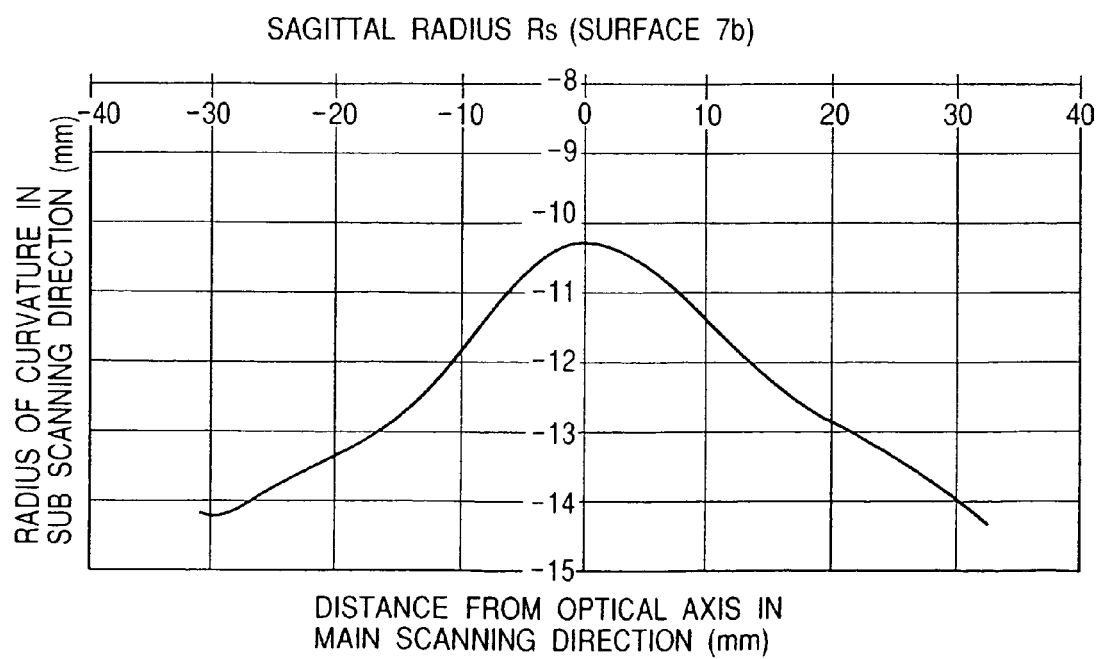
SAGITTAL RADIUS Rs (SURFACE 7b)
DISTANCE FROM OPTICAL AXIS IN
MAIN SCANNING DIRECTION (mm)

OPTICAL SCANNING APPARATUS AND IMAGE FORMING APPARATUS USING THE SAME

This application is a divisional of U.S. patent application Ser. No. 10/385,855, filed on Mar. 12, 2003, now U.S. Pat. No. 6,965,465, which is a divisional of U.S. patent application Ser. No. 09/861,721, filed on May 22, 2001, now U.S. Pat. No. 6,590,688 B2, issued Jul. 8, 2003.

BACKGROUND OF THE INVENTION

1. Field of the Invention

This invention relates to an optical scanning apparatus and an image forming apparatus using the same, and particularly is suitable for an apparatus such as a laser beam printer or a digital copier having, for example, the electrophotographic process adapted to reflect and deflect one or more beams emitted from light source means by a polygon mirror as a light deflector, and optically scan a surface to be scanned through an fθ lens system having the fθ characteristic to thereby record image information.

Particularly, the present invention relates to an optical scanning apparatus in which the shapes of a plurality of lenses constituting scanning optical means are appropriately set to thereby correct the curvature of image field in the main scanning direction and the sub scanning direction, the fθ characteristic and the fluctuation of the magnification in the sub scanning direction so that good images are always obtained, and an image forming apparatus using the same.

2. Related Background Art

Heretofore, in an optical scanning apparatus such as a laser beam printer, a beam light-modulated and emitted from light source means in conformity with an image signal is periodically deflected by a light deflector comprising, for example, a rotatable polygon mirror, and is converged into a spot shape on the surface of a photosensitive recording medium (photosensitive drum) by an fθ lens system having the fθ characteristic, and optically scans the surface of the recording medium to thereby effect image recording.

FIG. 18 of the accompanying drawings is a schematic view of the essential portions of an optical scanning optical system according to the prior art. In this figure, a divergent beam emitted from light source means 91 is made into a substantially parallel beam by a collimator lens 92, and this beam (the quantity of light) is shaped by an aperture stop 93 and enters a cylindrical lens 94 having refractive power only in the sub scanning direction. Of the beam having entered the cylindrical lens 94, that part in the main scanning section emerges intact and that part in the sub scanning section converges and is imaged as a substantially linear image near the deflecting surface 95a of a light deflector 95 comprising a rotatable polygon mirror.

The beam reflected and deflected by the deflecting surface 95a of the light deflector 95 is directed onto the surface of a photosensitive drum as a surface 97 to be scanned through an fθ lens system 96 having the fθ characteristic, and the light deflector 95 is rotated in the direction of arrow A to thereby optically scan the surface 97 of the photosensitive drum in the direction of arrow B (the main scanning direction) and effect the recording of image information.

To effect highly accurate recording of image information in an optical scanning apparatus of this kind, it is important that curvature of image field is well corrected over the entire surface to be scanned and the spot diameter is uniform, that an equal speed is kept when the surface of the photosensitive drum is light-scanned (fθ characteristic), that the lateral magnification in the sub scanning direction is uniformly corrected over the entire effective scanning area and the spot diameter in the sub scanning direction is uniform, and that in a multibeam scanning apparatus using light source means emitting a plurality of beams, the lateral magnification in the sub scanning direction is uniformly corrected over the entire effective scanning area and the pitch interval between scanning lines is made constant. Various optical scanning apparatuses or fθ lens systems satisfying such optical characteristics have heretofore been proposed.

For example, Japanese Patent Application Laid-Open No. 7-318796 discloses an fθ lens system comprising a combination of a glass toric lens and a plastic toric lens each having a cylindrical lens surface on the incidence surface side thereof and a toric surface on the emergence surface side thereof. In this publication, however, one surface is a cylindrical surface and therefore, there has been the problem that the degree of freedom is small with regard to the above-mentioned aberration correction and the above-mentioned aberration correction is difficult. So, in the present invention, as will be described later, all fθ lenses constituting an fθ lens system are made into toric lenses having toric surfaces on both surfaces thereof. Further, each of the aforementioned fθ lenses has both of its surfaces made into a non-arcuate main scanning sectional shape and has its radius of curvature in the sub scanning direction continuously varied, whereby the above-mentioned aberrations are corrected. Also, the above-mentioned publication does not bear the description of sub scanning magnification, and has not taken it into consideration to reduce the degree of sensitivity of focus fluctuation in the sub scanning direction and to uniformly correct sub scanning magnification in an effective scanning area on a surface to be scanned. The present invention takes these into consideration and can construct an optical scanning apparatus suited for the highly accurate recording of image information.

Also, in Embodiment 1 of Japanese Patent Application Laid-Open No. 7-318796, the power of a glass toric lens 22 on the scanned surface 14 side in the main scanning direction is greater than the power of a plastic toric lens 21 on the polygon mirror 12 side in the main scanning direction and therefore, a problem is left in achieving compactness. In Embodiment 2 of Japanese Patent Application Laid-Open No. 7-318796, both of the power of the plastic toric lens 21 in the sub scanning direction and the power of the glass toric lens 22 in the sub scanning direction are positive and therefore, there is left the problem that when the two lenses 21 and 22 are brought close to the polygon mirror 12 side, sub scanning magnification increases.

On the other hand, with the compactness and lower cost of laser beam printers, digital copiers, etc., similar conditions have also been required for image forming apparatuses.

What makes these requirements compatible is proposed, for example, in Japanese Patent Application Laid-Open No. 10-232346. In this publication, curvature of image field and distortion are corrected well and the influence of a change or the like in the spot diameter by image height is reduced.

However, to achieve further compactness of the optical scanning apparatus, it is necessary to shorten the focal length of the fθ lens system, widen the angle of field thereof and bring the fθ lens close to the polygon mirror which is deflecting means. All these are factors which make aberration correction difficult, and there has been the problem that when compactness has been made, the curvature of image field in a wide field angle area, the fθ characteristic, and the fluctuation of the magnification in the sub scanning direction are not corrected well.

Also, another problem arises with the widening of the angle of field. Heretofore, a beam emitted from light source means has been incident on the deflecting surface of the polygon mirror obliquely with respect to the optical axis of the fθ lens system, and at this time, the reflecting position at which the beam is reflected by the deflecting surface changes continuously and asymmetrically with respect to the center of scanning. This asymmetrical change in the reflecting position affects particularly the imaging position and it becomes difficult to obtain flat curvature of image field.

The above-mentioned asymmetrical change in the reflecting position is caused by making the beam from the light source means incident obliquely with respect to the optical axis of the fθ lens system and therefore, it can be eliminated by making the beam from the light source means incident from the direction of the optical axis of the fθ lens system, but the disposition is unreasonable and the beam must be made incident from the outside of the fθ lens system and therefore, the asymmetry given to the curvature of image field by the asymmetrical change in the reflecting position cannot be eliminated.

So, for example, Japanese Patent Application Laid-Open No. 4-60608 and Japanese Patent Application Laid-Open No. 9-265041 disclose various examples in which vertical asymmetry is introduced into the meridional shape of the fθ lens constituting the fθ lens system.

However, to achieve the compactness of the fθ lens system, curvature of image field, the fθ characteristic and the fluctuation of the magnification in the sub scanning direction must be corrected well even in a wide field angle area exceeding the angle of field ±47°, and these have not always been satisfactory.

Also, to make the optical scanning apparatus correspond to a multibeam, it has been necessary to make a beam emergent from a collimator lens into a substantially parallel beam in order to reduce the jitter in the main scanning direction.

Also, Japanese Patent Application Laid-Open No. 10-333069 discloses a construction in which in order to solve the problem arising in a multibeam scanning optical system that the relative interval between scanning lines is changed by the scanning position, the power distribution of a scanning lens and a correction lens in the sub scanning direction is designed such that the effect of correcting the curvature of image field in the sub scanning direction is obtained. However, the power of the correction lens nearest to the surface to be scanned in the main scanning direction is greatest and therefore, a problem is left in achieving compactness.

Also, in Japanese Patent Application Laid-Open No. 5-5852, in order to realize a bright fθ lens system, the fθ lens system is of two-unit two-lens construction, and prescribes the relations among the sub scanning magnification β, the composite focal length fs with respect to the sub scanning direction and the radii of curvature ry3 and ry4 of the third and fourth surfaces in the sub scanning direction. However, the power of the first lens near to a rotatable polygon mirror in the main scanning direction is smaller than the power of the second lens near to a surface to be scanned in the main scanning direction and therefore, a problem is left in achieving compactness.

SUMMARY OF THE INVENTION

The present invention has as its object the provision of an optical scanning apparatus in which the shapes of a plurality of lenses constituting scanning optical means are appropriately set to thereby well correct the curvature of image field and distortion in the main scanning direction and the curvature of image field and the fluctuation of magnification in the sub scanning direction and which, in spite of a compact construction, is suited for highly definite printing in which the sub scanning magnification is restrained low, and an image forming apparatus using the same.

To achieve the above object, the optical scanning apparatus of the present invention is an optical scanning apparatus comprising incidence optical means for causing a beam emitted from light source means to be incident on deflecting means, and scanning optical means for causing the beam reflected and deflected by the deflecting means to be imaged on a surface to be scanned, characterized in that the scanning optical means has a first lens on the deflecting means side and a second lens on the surface to be scanned side, the first lens has positive power in the main scanning direction and has negative power in the sub scanning direction, the power of the first lens in the main scanning direction is greater than the power of the second lens in the main scanning direction, and the second lens has positive power in the sub scanning direction.

In the above-described optical scanning apparatus, when the power of the scanning optical means in the main scanning direction is defined as φm and the power of the second lens in the main scanning direction is defined as φ2m, the condition that $$-0.5 \leq \phi 2m/\phi m \leq 0.15$$

is satisfied.

In the above-described optical scanning apparatus, the first lens and the second lens are disposed more adjacent to the deflecting means than to the midpoint of the distance from the deflecting surface of the deflecting means to the surface to be scanned.

In the above-described optical scanning apparatus, each of the first and second lenses is an aspherical lens in which the main scanning sectional shapes of both surfaces are non-arcuate shapes.

In the above-described optical scanning apparatus, the scanning optical means has a plurality of meridional asymmetrical surfaces of which the main scanning sectional shape varies asymmetrically in the main scanning direction across an optical axis.

In the above-described optical scanning apparatus, the meridional asymmetrical surfaces are formed on that lens surface of the second lens which faces the surface to be scanned.

In the above-described optical scanning apparatus, each of the first and second lenses is an aspherical lens in which the radii of curvature of both surfaces in the sub scanning direction continuously vary away from an optical axis along the main scanning direction on at least one side across the optical axis.

In the above-described optical scanning apparatus, the scanning optical means has a plurality of sagittal asymmetrically varying surfaces of which the radii of curvature in the sub scanning direction vary asymmetrically in the main scanning direction across an optical axis.

In the above-described optical scanning apparatus, two or more of the plurality of sagittal asymmetrically varying surfaces are sagittal deformed surfaces of which the sizes of the radii of curvature in the sub scanning direction differ in the main scanning direction across the optical axis, and on two or more of the two or more sagittal deformed surfaces, the sides on which the radii of curvature in the sub scanning direction become larger than the radii of curvature on the optical axis are all present on the same side with respect to the optical axis, or the sides on which the radii of curvature in the sub scanning direction become smaller than the radii of curvature on the optical axis are all present on the same side with respect to the optical axis.

In the above-described optical scanning apparatus, the scanning optical means has a plurality of main and sub asymmetrical surfaces which are the meridional asymmetrical surfaces and also are the sagittal asymmetrically varying surfaces.

In the above-described optical scanning apparatus, when the power of the first lens in the main scanning direction is defined as $\phi1m$ and the power of the scanning optical means in the main scanning direction is defined as $\phi m$, the condition that $$0.85 \leq \phi1m/\phi m \leq 1.3$$

is satisfied.

In the above-described optical scanning apparatus, when the power of the first lens in the sub scanning direction is defined as $\phi1s$ and the power of the second lens in the sub scanning direction is defined as $\phi2s$, the condition that $$-1.8 \leq \phi1s/\phi2s \leq -0.4$$

is satisfied.

In the above-described optical scanning apparatus, when the power of the first lens in the main scanning direction is defined as $\phi1m$ and the power of the first lens in the sub scanning direction is defined as $\phi1s$ and the power of the second lens in the main scanning direction is defined as $\phi2m$ and the power of the second lens in the sub scanning direction is defined as $\phi2s$, the condition that $$\phi1s < \phi2m < \phi1m < \phi2s$$

is satisfied.

In the above-described optical scanning apparatus, when the power of the first lens in the main scanning direction is defined as $\phi1m$ and the power of the first lens in the sub scanning direction is defined as $\phi1s$ and the power of the second lens in the main scanning direction is defined as $\phi2m$ and the power of the second lens in the sub scanning direction is defined as $\phi2s$, the condition that $$|\phi2m| < |\phi1m| < |\phi1s| < |\phi2s|$$

is satisfied.

In the above-described optical scanning apparatus, when the radius of curvature of that surface of the first lens which faces the deflecting means in the main scanning direction is defined as r1m and the radius of curvature of the aforementioned surface in the sub scanning direction is defined as R1s and the radius of curvature of that surface of the first lens which faces the surface to be scanned in the main scanning direction is defined as R2m and the radius of curvature of the aforementioned surface in the sub scanning direction is defined as R2s and the radius of curvature of that surface of the second lens which faces the deflecting means in the main scanning direction is defined as R3m and the radius of curvature of the aforementioned surface in the sub scanning direction is defined as R3s and the radius of curvature of that surface of the second lens which faces the surface to be scanned in the main scanning direction is defined as R4m and the radius of curvature of the aforementioned surface in the sub scanning direction is defined as R4s, the conditions that $$R1m < R2m < 0 < R4m < R3m$$

$$R2s < R1s < 0$$

$$R3s < R4s < 0$$

$$R1m < R1s < 0$$

$$R2s < R2m < 0$$

$$|R4s| < R4m$$

are satisfied.

In the above-described optical scanning apparatus, the effective end portions of all surfaces of the first and second lenses are displaced more toward the deflecting means than the surface vertexes of the lenses.

In the above-described optical scanning apparatus, when the f$\theta$ coefficient of the scanning optical means is defined as k and the effective scanning width thereof is defined as W, the condition that $$k/W \leq 0.6$$

is satisfied.

In the above-described optical scanning apparatus, when the distance from the deflecting surface of the deflecting means to the surface to be scanned is defined as L and the effective scanning width is defined as W, the condition that $$L/W \leq 0.8$$

is satisfied.

In the above-described optical scanning apparatus, when the distance from the defecting surface of the deflecting means to that surface of the second lens which faces the surface to be scanned is defined as d and the effective scanning width is defined as W, the condition that $$d/W \leq 0.2$$

is satisfied.

In the above-described optical scanning apparatus, when the distance from the deflecting surface of the deflecting means to that surface of the second lens which faces the surface to be scanned is defined as d and the distance from the deflecting surface of the deflecting means to the surface to be scanned is defined as L, the condition that $$d/L \leq 0.25$$

is satisfied.

In the above-described optical scanning apparatus, each of the first and second lenses comprises a toric lens of which both surfaces have toric surfaces.

In the above-described optical scanning apparatus, the first lens is a meniscus lens of which the shape in the main scanning direction has its convex surface facing the surface to be scanned.

In the above-described optical scanning apparatus, the incidence optical means has a condensing lens for converting the beam emitted from the light source means into a substantially parallel beam.

In the above-described optical scanning apparatus, a plurality of beams are emitted from the light source means.

In the above-described optical scanning apparatus, the incidence optical means has a condensing lens for converting the beam emitted from the light source means into a convergent beam.

In the above-described optical scanning apparatus, when the distance from the deflecting surface of the deflecting means to the converging point by the condensing lens is defined as S and the fθ coefficient of the scanning optical means is defined as k, the condition that $$|S|/k \geq 5$$

is satisfied.

Also, the image forming apparatus of the present invention is an image forming apparatus provided with the above-described optical scanning apparatus, a photosensitive member disposed on the surface to be scanned, a developing device for developing an electrostatic latent image formed on the photosensitive member by the beam scanned by the optical scanning apparatus as a toner image, a transferring device for transferring the developed toner image to a transfer material, and a fixing device for fixing the transferred toner image on the transfer material.

Also, the image forming apparatus of the present invention is an image forming apparatus provided with the above-described optical scanning apparatus, and a printer controller for converting code data inputted from an external device into an image signal and inputting it to the optical scanning apparatus.

Also, the optical scanning apparatus of the present invention is an optical scanning apparatus comprising incidence optical means for causing a beam emitted from light source means to be incident on deflecting means, and scanning optical means for causing the beam reflected and deflected by the deflecting means to be imaged on a surface to be scanned, characterized in that the scanning optical means has a first lens on the deflecting means side, and has a second lens on the surface to be scanned side, each of the first and second lenses comprises a toric lens of which both surfaces have toric surfaces, the first lens has negative power in the sub scanning direction, and the second lens has positive power in the sub scanning direction.

In the above-described optical scanning apparatus, when the power of the scanning optical means in the main scanning direction is defined as φm and the power of the second lens in the main scanning direction is defined as φ2m, the condition that $$-0.5 \leq \phi 2m/\phi m \leq 0.15$$

is satisfied.

In the above-described optical scanning apparatus, the first lens and the second lens are disposed more adjacent to the deflecting means than to the midpoint of the distance from the deflecting surface of the deflecting means to the surface to be scanned.

In the above-described optical scanning apparatus, each of the first and second lenses is an aspherical lens in which the main scanning sectional shapes of both surfaces are non-arcuate shapes.

In the above-described optical scanning apparatus, the scanning optical means has a plurality of meridional asymmetrical surfaces of which the main scanning sectional shapes vary asymmetrically in the main scanning direction across an optical axis.

In the above-described optical scanning apparatus, the meridional asymmetrical surfaces are formed on that lens surface of the second lens which faces the surface to be scanned.

In the above-described optical scanning apparatus, each of the first and second lenses is an aspherical lens in which the radii of curvature of both surfaces in the sub scanning direction continuously vary away from an optical axis along the main scanning direction on at least one side across the optical axis.

In the above-described optical scanning apparatus, the scanning optical means has a plurality of sagittal asymmetrically varying surfaces of which the radii of curvature in the sub scanning direction vary asymmetrically in the main scanning direction across an optical axis.

In the above-described optical scanning apparatus, two or more of the plurality of sagittal asymmetrically varying surfaces are sagittal deformed surfaces of which the sizes of the radii of curvature in the sub scanning direction differ in the main scanning direction across the optical axis, and on two or more of the two or more sagittal deformed surfaces, the sides on which the radii of curvature in the sub scanning direction become larger than the radii of curvature on the optical axis are all present on the same side with respect to the optical axis, or the sides on which the radii of curvature in the such scanning direction become smaller than the radii of curvature on the optical axis are all present on the same side with respect to the optical axis.

In the above-described optical scanning apparatus, the scanning optical means has a plurality of main and sub asymmetrical surfaces which are the meridional asymmetrical surfaces and also are the sagittal asymmetrically varying surfaces.

In the above-described optical scanning apparatus, when the power of the first lens in the main scanning direction is defined as φ1m and the power of the scanning optical means in the main scanning direction is defined as φm, the condition that $$0.85 \leq \phi 1m/\phi m \leq 1.3$$

is satisfied.

In the above-described optical scanning apparatus, when the power of the first lens in the sub scanning direction is defined as φ1s and the power of the second lens in the sub scanning direction is defined as φ2s, the condition that $$-0.8 \leq \phi 1s/\phi 2s \leq -0.4$$

is satisfied.

In the above-described optical scanning apparatus, when the power of the first lens in the main scanning direction is defined as φ1m and the power of the first lens in the sub scanning direction is defined as φ1s and the power of the second lens in the main scanning direction is defined as φ2m and the power of the second lens in the sub scanning direction is defined as φ2s, the condition that $$\phi 1s < \phi 2m < \phi 1m < \phi 2s$$

is satisfied.

In the above-described optical scanning apparatus, when the power of the first lens in the main scanning direction is defined as φ1m and the power of the first lens in the sub scanning direction is defined as φ1s and the power of the second lens in the main scanning direction is defined as φ2m and the power of the second lens in the sub scanning direction is defined as φ2s, the condition that $$|\phi 2m|<|\phi 1m|<|\phi 1s|<|\phi 2s|$$

is satisfied.

In the above-described optical scanning apparatus, when the radius of curvature of that surface of the first lens which faces the deflecting means in the main scanning direction is defined as R1m and the radius of curvature of the aforementioned surface in the sub scanning direction is defined as R/S and the radius of curvature of that surface of the first lens which faces the surface to be scanned in the main scanning direction is defined as R2m and the radius of curvature of the aforementioned surface in the sub scanning direction is defined as R2s and the radius of curvature of that surface of the second lens which faces the deflecting means in the main scanning direction is defined as R3m and the radius of curvature of the aforementioned surface in the sub scanning direction is defined as R3s and the radius of curvature of that surface of the second lens which faces the surface to be scanned in the main scanning direction is defined as R4m and the radius of curvature of the aforementioned surface in the sub scanning direction is defined as R4s, the conditions that $$R1m<R2m<0<R4m<R3m$$

$$R2s<R1s<0$$

$$R3s<R4s<0$$

$$R1m<R1s<0$$

$$R2s<R2m<0$$

$$|R4s|<R4m$$

are satisfied.

In the above-described optical scanning apparatus, the effective end portions of all surfaces of the first and second lenses are displaced more toward the deflecting means than the surface vertexes of the lenses.

In the above-described optical scanning apparatus, when the fθ coefficient of the scanning optical means is defined as k and the effective scanning width thereof is defined as W, the condition that $$k/W \leq 0.6$$

is satisfied.

In the above-described optical scanning apparatus, when the distance from the deflecting surface of the deflecting means to the surface to be scanned is defined as L and the effective scanning width is defined as W, the condition that $$L/W \leq 0.8$$

is satisfied.

In the above-described optical scanning apparatus, when the distance from the deflecting surface of the deflecting means to that surface of the second lens which faces the surface to be scanned is defined as d and the effective scanning width is defined as W, the condition that $$d/W \leq 0.2$$

is satisfied.

In the above-described optical scanning apparatus, when the distance from the deflecting surface of the deflecting means to that surface of the second lens which faces the surface to be scanned is defined as d and the distance from the deflecting surface of the deflecting means to the surface to be scanned is defined as L, the condition that $$d/L \leq 0.25$$

is satisfied.

In the above-described optical scanning apparatus, the first lens is a meniscus lens of which the shape in the main scanning direction has its convex surface facing the surface to be scanned.

In the above-described optical scanning apparatus, the incidence optical means has a condensing lens for converting the beam emitted from the light source means into a substantially parallel beam.

In the above-described optical scanning apparatus, a plurality of beams are emitted from the light source means.

In the above-described optical scanning apparatus, the incidence optical means has a condensing lens for converting the beam emitted from the light source means into a convergent beam.

In the above-described optical scanning apparatus, when the distance from the deflecting surface of the deflecting means to the converging point by the condensing lens is defined as S and the fθ coefficient of the scanning optical means is defined as k, the condition that $$|S|/k \geq 5$$

is satisfied.

Also, the image forming apparatus of the present invention is an image forming apparatus provided with the above-described optical scanning apparatus, a photosensitive member disposed on the surface to be scanned, a developing device for developing an electrostatic latent image formed on the photosensitive member by the beam scanned by the optical scanning apparatus as a toner image, a transferring device for transferring the developed toner image to a transfer material, and a fixing device for fixing the transferred toner image on the transfer material.

Also, the image forming apparatus of the present invention is an image forming apparatus provided with the above-described optical scanning apparatus, and a printer controller for converting code data inputted from an external device into an image signal and inputting it to the optical scanning apparatus.

Also, the optical scanning apparatus of the present invention is an optical scanning apparatus comprising incidence optical means for causing a beam emitted from light source means to be incident on deflecting means, and scanning optical means for causing the beam reflected and deflected by the deflecting means to be imaged on a surface to be scanned, characterized in that the scanning optical means has two or more optical elements including a first optical element nearest to the deflecting means and a second optical element nearest to the surface to be scanned, the first optical element has positive power in the main scanning direction, and has negative power in the sub scanning direction, the second optical element has positive power in the sub scanning direction, and among the two or more optical elements included in the scanning optical means, the power of the first optical element in the main scanning direction is greatest.

In the above-described optical scanning apparatus, when the power of the first optical element in the main scanning direction is defined as φ1m and the power thereof in the sub scanning direction is defined as φ1s and the power of the second optical element in the main scanning direction is defined as $\phi 2m$ and the power thereof in the sub scanning direction is defined as $\phi 2s$, the condition that $$\phi 1s < \phi 2m < \phi 1m < \phi 2s$$

is satisfied.

In the above-described optical scanning apparatus, when the power of the first optical element in the main scanning direction is defined as $\phi 1m$ and the power thereof in the sub scanning direction is defined as $\phi 1s$ and the power of the second optical element in the main scanning direction is defined as $\phi 2m$ and the power thereof in the sub scanning direction is defined as $\phi 2s$, the condition that $$|\phi 2m| < |\phi 1m| < |\phi 1s| < |\phi 2s|$$

is satisfied.

In the above-described optical scanning apparatus, the first optical element is a meniscus lens of which the shape in the main scanning direction has its convex surface facing the surface to be scanned.

In the above-described optical scanning apparatus, when the fθ coefficient of the scanning optical means is defined as k and the effective scanning width thereof is defined as W, the condition that $$k/W \leq 0.6$$

is satisfied.

In the above-described optical scanning apparatus, when the distance from the deflecting surface of the deflecting means to the surface to be scanned is defined as L and the effective scanning width is defined as W, the condition that $$L/W \leq 0.8$$

is satisfied.

In the above-described optical scanning apparatus, the first optical element and the second optical element are disposed more adjacent to the deflecting means than to the midpoint of the distance from the deflecting surface of the deflecting means to the surface to be scanned.

In the above-described optical scanning apparatus, when the distance from the deflecting surface of the deflecting means to that surface of the second optical element which faces the surface to be scanned is defined as d and the effective scanning width is defined as W, the condition that $$d/W \leq 0.2$$

is satisfied.

In the above-described optical scanning apparatus, when the distance from the deflecting surface of the deflecting means to that surface of the second optical element which faces the surface to be scanned is defined as d and the distance from the deflecting surface of the deflecting means to the surface to be scanned is defined as L, the condition that $$d/L \leq 0.25$$

is satisfied.

In the above-described optical scanning apparatus, the first optical element or the second optical element is a lens.

In the above-described optical scanning apparatus, the first optical element or the second optical element is a reflecting mirror.

In the above-described optical scanning apparatus, the first optical element and the second optical element are lenses.

In the above-described optical scanning apparatus, when the radius of curvature of that surface of the first lens which faces the deflecting means in the main scanning direction is defined as r1m and the radius of curvature of the aforementioned surface in the sub scanning direction is defined as R1s and the radius of curvature of that surface of the first lens which faces the surface to be scanned in the main scanning direction is defined as R2m and the radius of curvature of the aforementioned surface in the sub scanning direction is defined as R2s and the radius of curvature of that surface of the second lens which faces the deflecting means in the main scanning direction is defined as R3m and the radius of curvature of the aforementioned surface in the sub scanning direction is defined as R3s and the radius of curvature of that surface of the second lens which faces the surface to be scanned in the main scanning direction is defined as R4m and the radius of curvature of the aforementioned surface in the sub scanning direction is defined as R4s, the conditions that $$R1m < R2m < 0 < R4m < R3m$$

$$R2s < R1s < 0$$

$$R3s < R4s < 0$$

$$R1m < R1s < 0$$

$$R2s < R2m < 0$$

$$|R4s| < R4m$$

are satisfied.

In the above-described optical scanning apparatus, the effective end portions of all surfaces of the first and second lenses are displaced more toward the deflecting means than the surface vertexes of the lenses.

In the above-described optical scanning apparatus, the first optical element or the second optical element has a diffraction optical element.

In the above-described optical scanning apparatus, the first optical element is a diffraction optical element, and when the power of that diffracting surface of the diffraction optical element which faces the deflecting means in the main scanning direction is defined as $\phi d1$ and the power of that diffracting surface of the diffraction optical element which faces the surface to be scanned in the main scanning direction is defined as $\phi d2$, the conditions that $$\phi d1 \times \phi d2 < 0$$

$$|\phi d2| > \phi d1$$

are satisfied.

In the above-described optical scanning apparatus, a plurality of beams are emitted from the light source means.

Also, the image forming apparatus of the present invention is an image forming apparatus provided with the above-described optical scanning apparatus, a photosensitive member disposed on the surface to be scanned, a developing device for developing an electrostatic latent image formed on the photosensitive member by the beam scanned by the optical scanning apparatus as a toner image, a transferring device for transferring the developed toner image to a transfer material, and a fixing device for fixing the transferred toner image on the transfer material.

Also, the image forming apparatus of the present invention is an image forming apparatus provided with the above-described optical scanning apparatus, and a printer controller for converting code data inputted from an external device into an image signal and inputting it to the optical scanning apparatus.

BRIEF DESCRIPTION OF THE DRAWINGS

FIG. 2 shows the aspherical displacement amount of the meridional line of each surface of an fθ lens in Embodiment 1 of the present invention.

FIG. 3 shows the aspherical displacement amount of the meridional line of each surface of the fθ lens in Embodiment 1 of the present invention.

FIG. 8 shows the radius of curvature (sagittal line R) of each surface of an fθ lens in Embodiment 2 of the present invention in the sub scanning direction.

FIG. 9 shows the radius of curvature (sagittal line R) of each surface of the fθ lens in Embodiment 2 of the present invention in the sub scanning direction.

FIG. 12 shows the radius of curvature (sagittal line R) of each surface of an fθ lens in Embodiment 3 of the present invention in the sub scanning direction.

FIG. 13 shows the radius of curvature (sagittal line) of each surface of the fθ lens in Embodiment 3 of the present invention in the sub scanning direction.

Figure 1A:
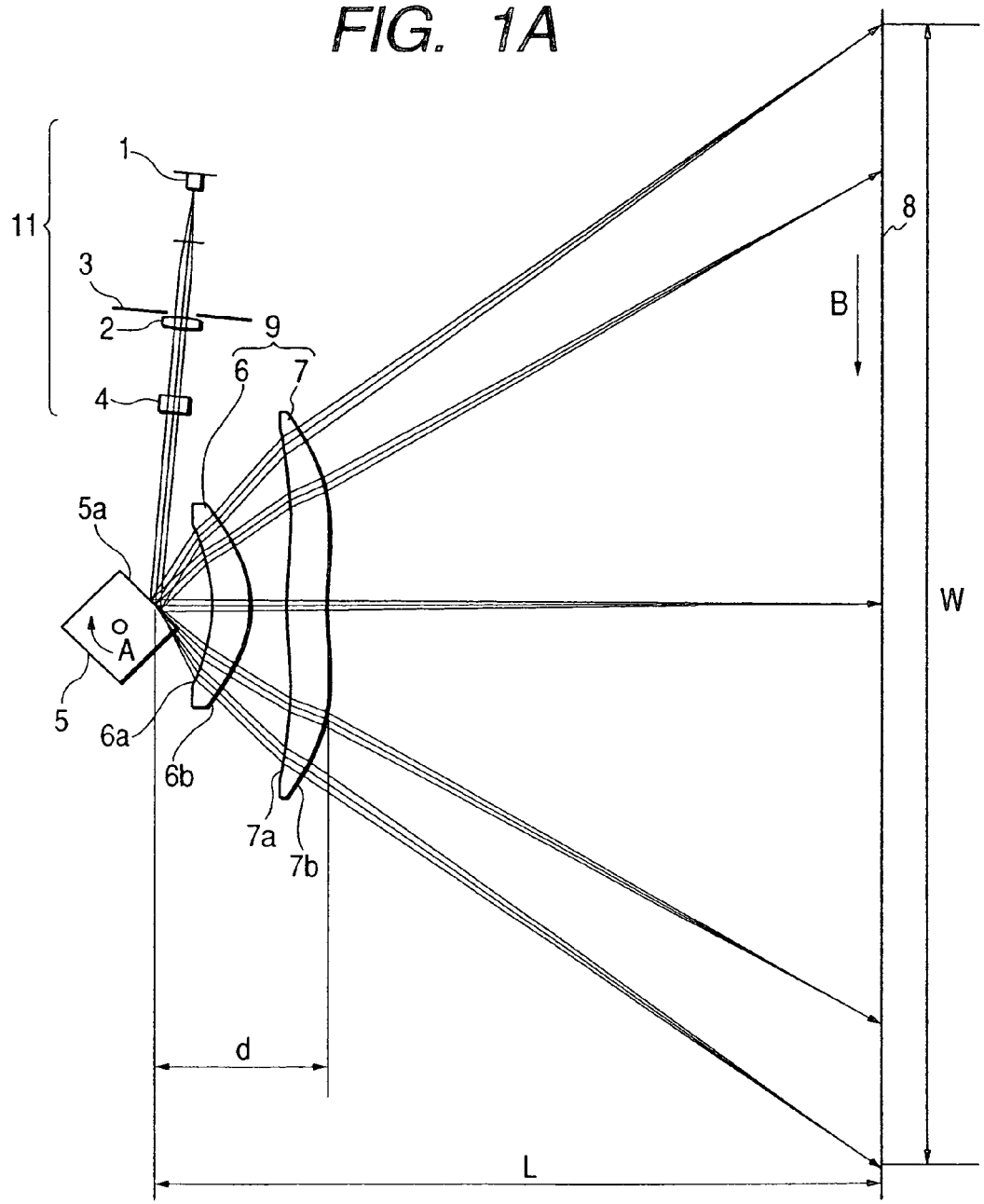
FIGS. 1A and 1B are cross-sectional views of the essential portions of Embodiment 1 of the present invention.

DESCRIPTION OF THE PREFERRED EMBODIMENTS (Shortening of the Full Length)

Scanning optical means is comprised of two (or three or more) lenses (or optical elements such as mirrors or diffraction optical elements) and the composite focal length of the lenses is the focal length f of the scanning optical means. That is, the rear side principal plane of the scanning optical means is at a position far from a surface to be scanned toward deflecting means by the focal length f of the scanning optical means.

At this time, assuming that f is a fixed value, to shorten the full length (the distance from the deflecting means to the surface to be scanned), it is necessary to shorten the distance from the deflecting means to the front side principal plane of the scanning optical means.

Description will hereinafter be made in detail with reference to FIGS. 1A and 1B.

At this time, the positions of the front side and rear side principal planes of the scanning optical means are determined by the power arrangement (power distribution) of first and second lenses, and each principal plane becomes close to the lens stronger in power. Consequently, the power of the first lens in the main scanning direction is made greater than the power of the second lens 7 in the main scanning direction ($\phi m1 > \phi m2$), whereby each principal plane can be positioned near the first lens 6 to thereby shorten the distance from the deflecting means 5 to the front side principal plane of the scanning optical means 9.

That is, the full length can be shortened to thereby achieve the downsizing of an optical scanning apparatus.

Also, as a method of shortening the full length, there is a method of shortening the focal length f of the scanning optical means 9. When the focal length f of the scanning optical means 9 is shortened, the angle of field θ becomes greater because the scanning effective range on the surface 8 to be scanned is the same from the relation that Y=fθ. At this time, the power of the first lens 6 in the main scanning direction is made greater than the power of the second lens 7 in the main scanning direction ($\phi m1 > \phi m2$), whereby performance correction in the main scanning direction becomes easy even at an image height of a wide angle of field, and it becomes possible to construct scanning optical means having had its full length shortened. Further, the thicknesses of the first and second lenses can be made small and therefore, the downsizing and reduced cost of the optical scanning apparatus can be achieved.

The second lens 7 plays the role of well correcting the main scanning performance (particularly the fθ characteristic) which cannot be completely corrected by the first lens 6. The second lens 7 can also be disposed near the surface 8 to be scanned, but can be disposed near the first lens 6 and the effective diameter of the lens and an optical box can be made small to thereby achieve the downsizing and reduced cost of the optical scanning apparatus.

(Reduction in Sub Scanning Magnification)

The sub scanning magnification will hereinafter be described in detail with reference to FIGS. 1A and 1B.

The sub scanning magnification βs is represented by an expression that $$\beta s = b/a$$

from the distance a from the front side principal plane of the scanning optical means 9 to the object point side focus position and the distance b from the rear side principal plane of the scanning optical means to the image point side focus position, and is of the negative sign in ordinary scanning optical means 9, but here, the absolute value thereof is taken as the sub scanning magnification.

In ordinary scanning optical means 9, the object point side focus position is set near the deflecting surface 5a of deflecting means 5 and the image point side focus position is set near a surface 8 to be scanned.

When as in the embodiments of the present invention, the compactness of the scanning optical means is achieved and the first lens 6 and the second lens 7 are disposed near a polygon mirror 5, a becomes short and b becomes long to thereby provide a construction which is high in the sub scanning magnification.

Description will now be made of the relation between the sub scanning magnification and the focus movement in the sub scanning direction or the amount of surface inclination.

The influence of the surface inclination of the polygon mirror 5 becomes great in proportion to the sub scanning magnification. The focus movement in the sub scanning direction becomes great in proportion to the square of the sub scanning magnification. In the scanning optical means 9 wherein as in the embodiments of the present invention, the first lens 6 and the second lens 7 are disposed near the polygon mirror 5, the influence of the focus movement in the sub scanning direction and the surface inclination of the polygon mirror appears remarkably and poses a problem. When the sub scanning magnification is high, the sub scanning magnification will change greatly even if the distance a or b is changed a little, because the sub scanning magnification is "a ratio of distance". That is, the effect of reducing the sub scanning magnification by making the power of the first lens 6 in the sub scanning direction negative and the power of the second lens 7 in the sub scanning direction positive is greater as the scanning optical means 9 becomes higher in the sub scanning magnification. Also, the effect of reducing the degree of sensitivity of the focus movement in the sub scanning direction which is proportional to the square of the sub scanning magnification is especially great.

Consequently, the effect of the present invention is high in compact scanning optical means.

(Meniscus Shape Having its Convex Surface Facing the Surface 8 to be Scanned)

Description will hereinafter be made in detail with reference to FIGS. 1A and 1B.

When the distance from the deflecting means 5 to the front side principal plane of the scanning optical means is shortened in the main scanning direction, the first lens 6 is made into a meniscus lens having its convex surface facing the surface 8 to be scanned, the main scanning performance (particularly curvature of image field in the main scanning direction) can be corrected well. The meniscus lens has its principal plane in a direction to which the convex surface is turned, and the first lens 6 is disposed close to the deflecting means 5. Since the first lens 6 has a power even in the sub scanning direction, the sub scanning magnification becomes higher and higher, and the focus movement in the sub scanning direction and the degree of sensitivity of the amount of surface inclination increase. So, it becomes important to make the power of the first lens 6 in the sub scanning direction negative and make the power of the second lens 7 in the sub scanning direction positive to thereby reduce the sub scanning magnification.

(Effect of an Aspherical Surface)

Description will hereinafter be made in detail with reference to FIGS. 1A and 1B.

A negative aspherical surface is provided in the first lens 6 to thereby make it into a shape in which the power becomes smaller from the optical axis toward the peripheral portion and correct the curvature of image field in the main scanning direction at an image height of a wide angle of field.

Also, a positive aspherical surface is provided in the second lens 7 to thereby make it into a shape in which the power becomes greater from the optical axis toward the peripheral portion and correct the fθ characteristic at an image height of a wide angle of field.

The two surfaces of each of the first and second lenses are made into aspherical shapes, and the shapes are bent in the incidence surface and the emergence surface to thereby construct a shape optimum for the performance correction in the main scanning direction.

Figure 1B:
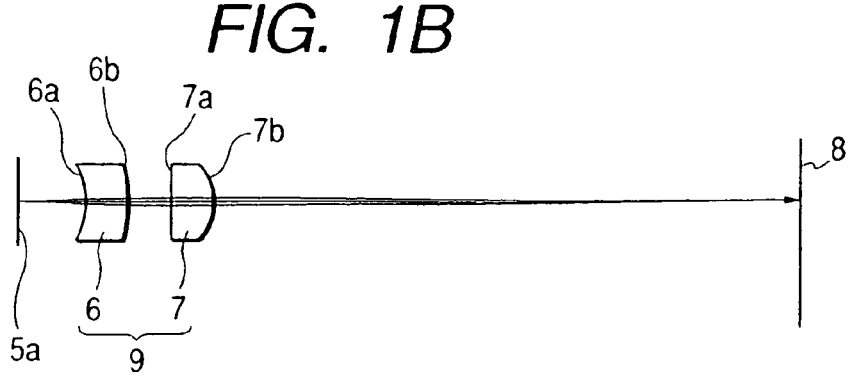

FIG. 1A is a cross-sectional view (main scanning sectional view) of the essential portions of an optical scanning apparatus according to Embodiment 1 of the present invention in the main scanning direction, and FIG. 1B is a cross-sectional view (sub scanning sectional view) of the essential portions of FIG. 1A in the sub scanning direction.

Herein, the direction in which a beam is reflected and deflected (deflected and scanned) by the deflecting means is defined as the main scanning direction (meridional direction), and a direction orthogonal to the optical axis of the scanning optical means and the main scanning direction is defined as the sub scanning direction (sagittal direction).

In FIG. 1A, reference numeral 1 designates light source means comprising, for example, a semiconductor laser. Reference numeral 3 denotes an aperture stop which adjusts the diameter of beam passing therethrough. Reference numeral 2 designates a collimator lens as a condensing lens, which converts the beam emitted from the light source means into a substantially parallel beam. Reference numeral 4 denotes a cylindrical lens (anamorphic lens) which has predetermined power only in the sub scanning direction, and causes the substantially parallel beam passed through the collimator lens 2 to be imaged as a substantially linear image near the deflecting surface (reflecting surface) 5a of a light deflector 5 which will be described later in the sub scanning section. Each of the elements such as the aperture stop 3, the collimator lens 2 and the cylindrical lens 4 constitutes an element of incidence optical means 11.

The light deflector 5 as deflecting means comprises, for example, a polygon mirror (rotary polygon mirror) of four-surface construction, and is rotated at a constant speed in the direction of arrow A by driving means (not shown) such as a motor.

Reference numeral 9 designates scanning optical means (an fθ lens system) having the condensing function and the fθ characteristic, and this scanning optical means 9 has first and second lenses 6 and 7 having shapes which will be described later. Each of the first and second lenses 6 and 7 in the present embodiment comprises a toric lens of which two surfaces have toric surfaces, and the first lens 6 has positive power in the main scanning direction and negative power in the sub scanning direction, and the second lens 7 has positive power in the sub scanning direction, and causes the beam reflected and deflected by the light deflector 5 and based on image information to be imaged on the surface 8 of a photosensitive drum as the surface to be scanned, and has the inclination correcting function by making the deflecting surface 5a of the light deflector 5 and the surface 8 to be scanned optically conjugate with each other in the sub scanning section.

In the present embodiment, the beam emitted from the semiconductor laser 1 has its quantity of light limited by the aperture stop 3, is converted into a substantially parallel beam by the collimator lens 2 and enters the cylindrical lens 4. That part of the substantially parallel beam having entered the cylindrical lens 4 which is in the main scanning section emerges therefrom as it is. Also, that part of the substantially parallel beam which is in the sub scanning section converges and is imaged as a substantially linear image (a linear image elongated in the main scanning direction) on the deflecting surface 5a of the light deflector 5. The beam reflected and deflected by the deflecting surface 5a of the light deflector 5 is then imaged into a spot shape on the surface 8 of the photosensitive drum through the first and second lenses 6 and 7, and the light deflector 5 is rotated in the direction of arrow A to thereby optically scan the surface 8 of the photosensitive drum at an equal speed in the direction of arrow B (the main scanning direction). Thereby image recording is effected on the surface 8 of the photosensitive drum as a recording medium.

Description will now be made of the features of the first and second fθ lenses 6 and 7 constituting the fθ lens system 9 in the present embodiment.

In the present embodiment, the positive power (refractive power) of the fθ lens system 9 is appropriately distributed into the first lens 6 and the second lens 7 to thereby obtain a good curvature of image field characteristic in the main scanning direction and the sub scanning direction.

Also, in the present embodiment, in the main scanning section, the first lens 6 is made into a positive meniscus lens having its concave surface facing the polygon mirror 5, and in the vicinity of the optical axis of the second lens 7 is made into a meniscus lens having its convex surface facing the polygon mirror 5 and having very little power. Particularly the power of the first lens 6 is made greater than the power of the second lens 7 to thereby provide a construction which can well correct the curvature of image field characteristic in the main scanning direction and the fθ characteristic even in a compact optical scanning apparatus.

Also, in the sub scanning section, the first lens 6 is made into a negative meniscus lens having its concave surface facing the polygon mirror 5, and the second lens 7 is made into a biconvex lens. Thereby, even in a compact scanning optical system wherein the rear side principal plane is positioned more adjacent to the surface 8 to be scanned than to the second lens 7 and the fθ lens system 9 is disposed near the polygon mirror 5 (d=31.4 mm, d being the distance from the deflecting surface 5a of the polygon mirror 5 to that surface 7b of the second lens 7 which faces the surface 8 to be scanned), the magnification in the sub scanning direction is restrained to a small value of β=−3.29.

In the present embodiment, the meridional shape of the first and second lenses 6 and 7 is formed by an aspherical shape which can be expressed as a function up to the sixteenth order. When for example, the point of intersection between the first and second lenses 6, 7 and the optical axis is defined as the origin and the optical axis direction is defined as the X-axis and an axis orthogonal to the optical axis in the main scanning section is defined as the Y-axis, the meridional direction corresponding to the main scanning direction is represented by the expression that $$X = \frac{Y^2/R}{1+\sqrt{1-(1+k)(Y/R)^2}} + B_4Y^4 + B_6Y^6 + B_8Y^8 + B_{10}Y^{10} + B_{12}Y^{12} + B_{14}Y^{14} + B_{16}Y^{16} \quad (A)$$

(where R is the meridional radius of curvature and K, $B_4$, $B_6$, $B_8$, $B_{10}$, $B_{12}$, $B_{14}$ and $B_{16}$ are aspherical surface coefficients), and in the main scanning direction, the radius of curvature Rs* in the sub scanning direction at a position separate by Y from the optical axis is represented by the expression that $$Rs^* = Rs \times (1 + D_2Y^2 + D_4Y^4 + D_6Y^6 + D_8Y^8 + D_{10}Y^{10}) \quad (B)$$

(where Rs is the radius of curvature in the sub scanning direction on the optical axis, and $D_2$, $D_4$, $D_6$, $D_8$ and $D_{10}$ are sagittal varying coefficients).

Table 1 below shows each coefficient representative of the aspherical shape of the fθ lens system 9 in the present embodiment and other characteristics.

In the present embodiment, the optical axis of the fθ lens system 9 is disposed in superposed relationship with a ray travelling toward the center of the effective scanning width of the surface 8 to be scanned, and does not give shift and tilt to the first and second lenses 6 and 7.

Each of the first and second lenses 6 and 7 is an aspherical lens in which the meridional shapes (main scanning sectional shapes) of two surfaces are non-arcuate and the radii of curvature (sagittal radii R) of the two surfaces in the sub scanning direction vary continuously and independently of the meridional shapes away from the optical axis along the main scanning direction on at least one side across the optical axis, and the distribution of the aspherical amount in the meridional direction and the amount of variation in the sagittal direction is appropriately done to thereby obtain a better curvature of image field characteristic and fθ characteristic and the constancy of the sub scanning magnification.

FIG. 2 is an illustration showing aspherical displacement amounts given to the meridional shapes of the surface 6a and 6b of the first lens 6, and FIG. 3 is an illustration showing aspherical displacement amounts given to the meridional shapes of the surfaces 7a and 7b of the second lens 7. In FIGS. 2 and 3, the axis of abscissas represents the distance from the optical axis in the main scanning direction, and both of the light source side and the opposite side of the light source side (the vertical direction of the lens, the main scanning direction) are indicated by absolute values. The axis of ordinates represents the amount by which the meridional shape has varied in the optical axis direction, and the sign + (plus) indicates the displacement toward the surface 8 to be scanned, and the sign − (minus) indicates the displacement toward the polygon mirror.

The meridional shape on the light source side is indicated by solid line, and the meridional shape on the opposite side of the light source side (the opposite side from the light source means with respect to the optical axis of the fθ lens system 9) is indicated by broken line. That surface 6a of the first lens 6 which faces the polygon mirror 5 is of a shape symmetrical in the vertical direction (the main scanning direction) across the optical axis, but the other surfaces 6b, 7a and 7b are meridional asymmetrical surfaces in which the meridional shapes at equal distances from the optical axis in the main scanning direction are displaced in the optical axis direction by amounts different in the vertical direction across the optical axis (the main scanning direction) and the main scanning sectional shapes are asymmetrically varied in the vertical direction across the optical axis (the main scanning direction). Also, at the effective end portions of all surfaces 6a, 6b, 7a and 7b of the first and second lenses 6 and 7 (the positions on the lens surfaces that a ray travelling toward the effective scanning end of the surface 8 to be scanned passes), there are provided meridional shapes displaced more toward the polygon mirror 5 than the surface vertexes (the points of intersection with the optical axis). Thereby the curvature of image field characteristic in the main scanning direction and the fθ characteristic are better corrected.

Figure 4:
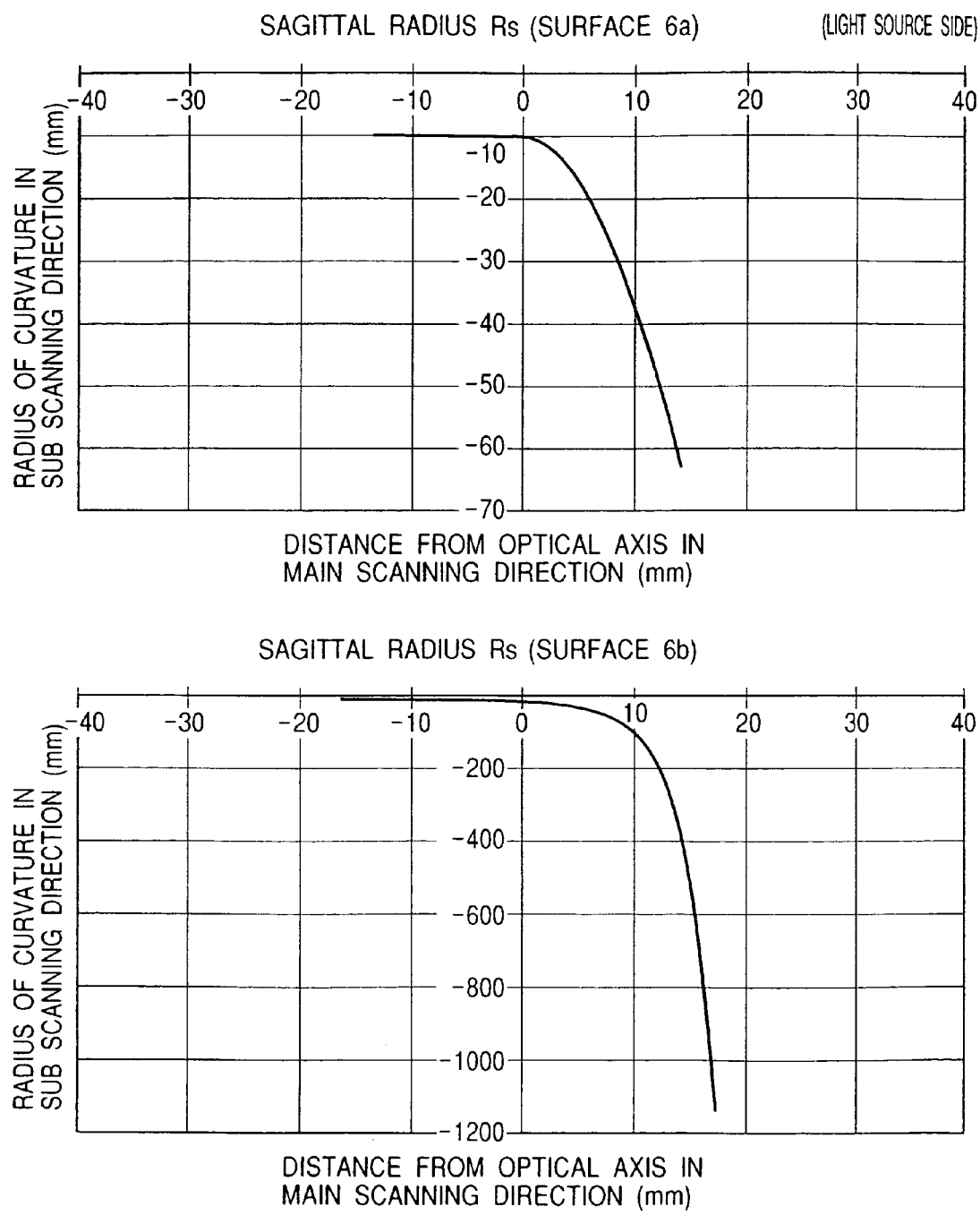
FIG. 4 shows the radius of curvature (sagittal line R) of each surface of the fθ lens in Embodiment 1 of the present invention in the sub scanning direction.
Figure 5:
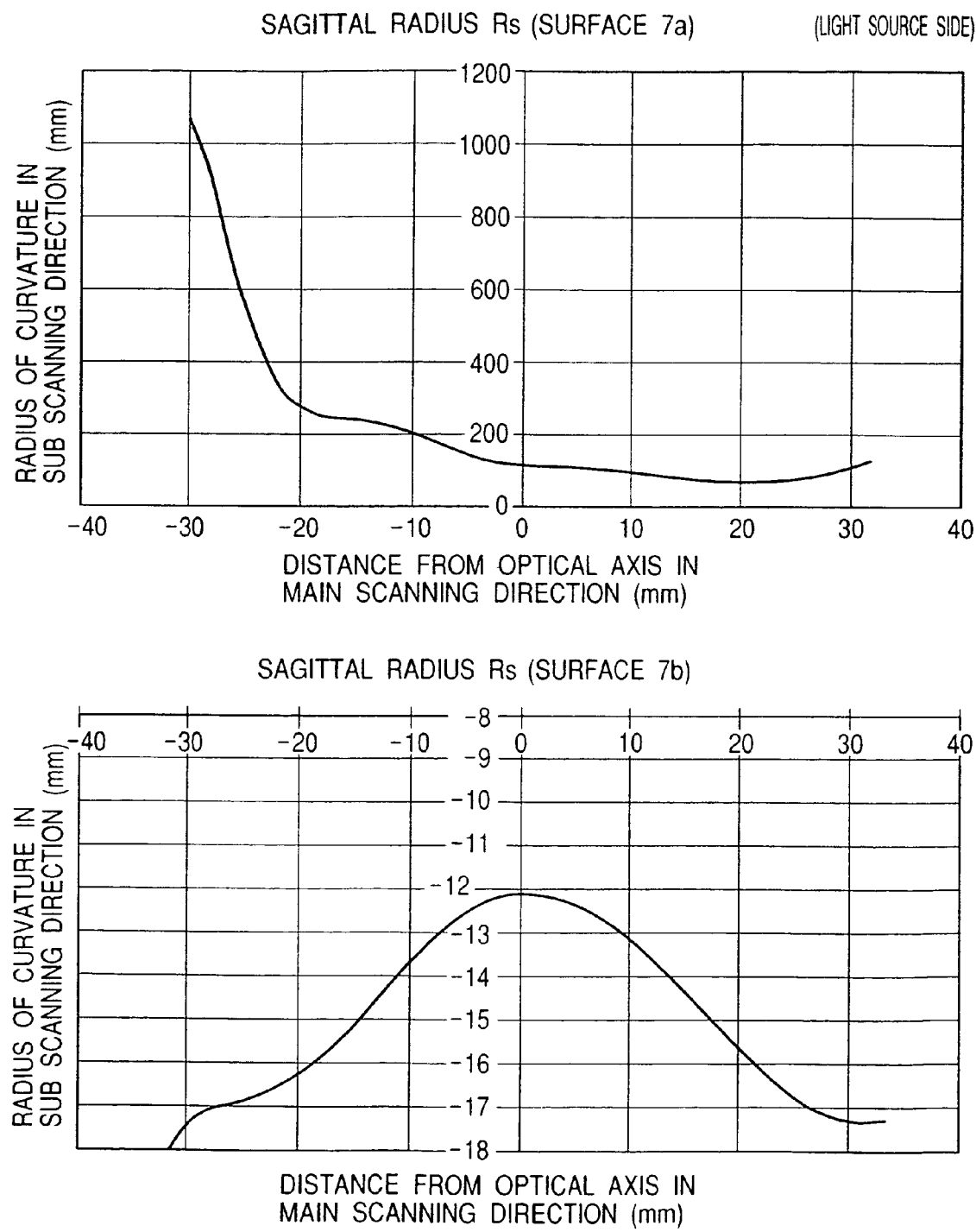
FIG. 5 shows the radius of curvature (sagittal line R) of each surface of the fθ lens in Embodiment 1 of the present invention in the sub scanning direction.

FIG. 4 is an illustration showing variations in the sagittal shapes R (Rs) of the surfaces 6a and 6b of the first lens 6, and FIG. 5 is an illustration showing variations in the sagittal shapes R (Rs) of the surfaces 7a and 7b of the second lens 7. The both surfaces 6a and 6b of the first lens 6 are large in the sagittal shape R on the light source side (the plus side in the axis of abscissas), and the sagittal shape R is varied so as to become continuously smaller toward the optical axis along the main scanning direction, and to become still smaller toward the opposite side of the light source side. That surface 7a of the second lens 7 which faces the polygon mirror 5 is large in the sagittal shape R on the opposite side of the light source side, and the sagittal shape R is varied so as to become continuously smaller toward the optical axis along the main scanning direction, and to become once smaller from on the optical axis toward the light source side, and the become larger with an inflection point in the course. Also, that surface 7b of the second lens 7 which faces the surface 8 to be scanned is varied so that the sagittal shape R may become asymmetrically large in the vertical direction across the optical axis (the main scanning direction).

At this time, all surfaces 6a, 6b, 7a and 7b of the first and second lenses 6 and 7 are aspherical surfaces in which the sagittal shape R varies away from the optical axis along the main scanning direction, and the sagittal shapes R of the both surface 6a and 6b of the first lens 6 and that surface 7a of the second lens 7 which faces the polygon mirror 5 are asymmetrically varied in the vertical direction across the optical axis (the main scanning direction), and are made into sagittal asymmetrically varying surfaces. Further, the both surfaces 6a and 6b of the first lens 6 are made into sagittal deformed surfaces in which the sagittal shape R on the light source side is made larger than the sagittal shape R on the optical axis and the sagittal shape R on the opposite side of the light source side is made smaller than that on the optical axis, and that surface 7a of the second lens 7 which faces the polygon mirror 5 is made into a sagittal deformed surface in which the sagittal shape R on the light source side is made larger than the sagittal shape R on the optical axis, and the sides on which the sagittal shapes R of the both surfaces 6a and 6b of the first lens become larger than the sagittal shape R on the optical axis and the sides on which the aforementioned sagittal shapes R become smaller than the sagittal shape R on the optical shape are all present on the same side with respect to the optical axis. Thereby the curvature of image field in the sub scanning direction and the uniformity of the sub scanning magnification are corrected well.

Thus, the fθ lens system 9 in the present embodiment has a plurality of main and sub asymmetrical surfaces which are the meridional asymmetrical surfaces and also are the sagittal asymmetrically varying surfaces, as described above.

In the present embodiment, to well correct the curvature of image field and distortion in the main scanning direction and the curvature of image field and the fluctuation of the magnification in the sub scanning direction, and to achieve a wide angle of field and the compactness of the entire apparatus, it is preferable to satisfy at least one of the following conditions.

(A1) When the power of the first lens 6 in the main scanning direction is defined as $\phi 1m$ and the power of the fθ lens system 9 in the main scanning direction is defined as $\phi m$, to satisfy the condition that $$0.85 \leq \phi 1m/\phi m \leq 1.3 \tag{1}$$

Conditional expression (1) is a condition for well correcting both of the curvature of image field in the main scanning direction and the fθ characteristic. If conditional expression (1) is departed from, it will become difficult to make these compatible. If particularly the upper limit value of conditional expression (1) is departed from, it will become difficult to correct the fθ characteristic, and if the lower limit value of conditional expression (1) is departed from, it will become difficult to correct curvature of image field.

In the present embodiment, $\phi m=0.00923$, $\phi 1m=0.00898$ and $$\phi 1m/\phi m=0.974,$$

and the lens system is constructed with a power arrangement which satisfies the above-mentioned conditional expression (1).

(A2) When the power of the first lens 6 in the sub scanning direction is defined as $\phi 1s$ and the power of the second lens 7 in the sub scanning direction is defined as $\phi 2s$, to satisfy the condition that $$-0.8 \leq \phi 1s/\phi 2s \leq -0.4 \tag{2}$$

Conditional expression (2) is a condition for reducing the sub scanning magnification. If the upper limit value of conditional expression (2) is departed from, it will become difficult to correct the curvature of image field in the sub scanning direction, and if the lower limit value of conditional expression (2) is departed from, the effect of reducing the sub scanning magnification will become small.

In the present embodiment, $\phi 1s=-0.02447$, $\phi 2s=0.04713$ and $$\phi 100s/\phi 2s=-0.519,$$

and the lens system is constructed with a power arrangement which satisfies the above-mentioned conditional expression (2).

(A3) When the power of the first lens 6 in the main scanning direction is defined as $\phi 1m$ and the power thereof in the sub scanning direction is defined as $\phi 1s$ and the power of the second lens 7 in the main scanning direction is defined as $\phi 2m$ and the power thereof in the sub scanning direction is defined as $\phi 2s$, to satisfy the condition that $$\phi 1s < \phi 2m < \phi 1m < \phi 2s \tag{3}$$

Conditional expression (3) is a condition for satisfying the curvatures of image field in the main scanning and sub scanning directions, the fθ characteristic and a reduction in the sub scanning magnification. By satisfying conditional expression (3), the above-mentioned items can be satisfied even in a compact optical scanning apparatus and a compact fθ lens system. If conditional expression (3) is departed from, it will become difficult to satisfy the above-mentioned items at a time.

In the present embodiment, $\phi 1m=0.00898$, $\phi 1s=-0.02447$, $\phi 2m=3.03E-6$, $\phi 2s=0.04713$, and the lens system is constructed with a power arrangement which satisfies the above-mentioned conditional expression (3).

(A4) When the power of the first lens 6 in the main scanning direction is defined as $\phi 1m$ and the power thereof in the sub scanning direction is defined as $\phi 1s$ and the power of the second lens 7 in the main scanning direction is defined as $\phi 2m$ and the power thereof in the sub scanning direction is defined as $\phi 2s$, to satisfy the condition that $$|\phi 2m| < |\phi 1m| < |\phi 1s| < |\phi 2s| \tag{4}$$

Conditional expression (4) is a condition for satisfying the curvatures of image field in the main scanning and sub scanning directions, the fθ characteristic and a reduction in the sub scanning magnification. By satisfying conditional expression (4), the above-mentioned items can be satisfied even in a compact optical scanning apparatus and a compact fθ lens system. If conditional expression (4) is departed from, it will become difficult to satisfy the above-mentioned items at a time.

In the present embodiment, φ1m=0.00898, φ1s=−0.02447, φ2m=3.03E−6, φ2s=0.04713, and the lens system is constructed with a power arrangement which satisfies the above-mentioned conditional expression (4).

By satisfying the above-mentioned conditional expression (1) or/and (2), it is possible to construct a scanning optical system (optical scanning apparatus) in which the curvatures of image field in the main scanning direction and the sub scanning direction and the fθ characteristics are corrected well by a compact fθ lens system 9, and the fluctuation of the magnification in the sub scanning direction can be reduced to thereby restrain the degree of sensitivity of focus movement in the sub scanning direction to a small level.

(A5) When the fθ coefficient of the fθ lens system 9 is defined as k and the effective scanning width on the surface 8 to be scanned is defined as W, to satisfy the condition that $$k/W \geq 0.6 \tag{5}$$

The fθ coefficient (mm/rad) is a coefficient by which the relation of the following expression is established when the angle of field is θ(rad) and the image height on the surface 8 to be scanned is Y(mm).

$$Y = k \times \theta$$

If at this time, in the main scanning direction, the beam incident on the deflecting means 5 is a parallel beam, the fθ coefficient k will become equal to the focal length of the fθ lens system 9.

In the present embodiment, the effective scanning width w=214 (mm) and the fθ coefficient k=110 (mm/rad), and $$k/W = 0.51$$

and the lens system is constructed with a wide angle of view (±56.20) which satisfies the above-mentioned conditional expression (5).

(A6) When the distance from the deflecting surface 5a of the polygon mirror 5 to the surface 8 to be scanned is defined as L and the effective scanning width is defined as W, to satisfy the condition that $$L/W < 0.8 \tag{6}$$

In the present embodiment, the distance L from the deflecting surface 5a of the polygon mirror 5 to the surface 8 to be scanned is L=134 mm to thereby obtain L/W=0.63, and therefore the above-mentioned conditional expression (6) is satisfied to thereby achieve the compactness of the entire apparatus.

(A7) When the distance from the deflecting surface 5a of the polygon mirror 5 to that surface 7b of the second lens 7 which faces the surface 8 to be scanned is defined as d and the effective scanning width is defined as W, to satisfy the condition that $$d/W \leq 0.2 \tag{7}$$

In the present embodiment, the distance d from the deflecting surface 5a of the polygon mirror 5 to that surface 7b of the lens 7 which faces the surface 8 to be scanned is d=30.72 mm and $$d/W = 0.14$$

and the above-mentioned conditional expression (7) is satisfied to thereby achieve the compactness of the entire apparatus.

(A8) When the distance from the deflecting surface 5a of the polygon mirror 5 to that surface 7b of the second lens 7 which faces the surface 8 to be scanned is defined as d and the distance from the deflecting surface 5a of the polygon mirror 5 to the surface 8 to be scanned is defined as L, to satisfy the condition that $$d/L \leq 0.25 \tag{8}$$

In the present embodiment, $$d/L = 0.23$$

and the above-mentioned conditional expression (8) is satisfied to thereby achieve the compactness of the entire apparatus.

Figure 6:
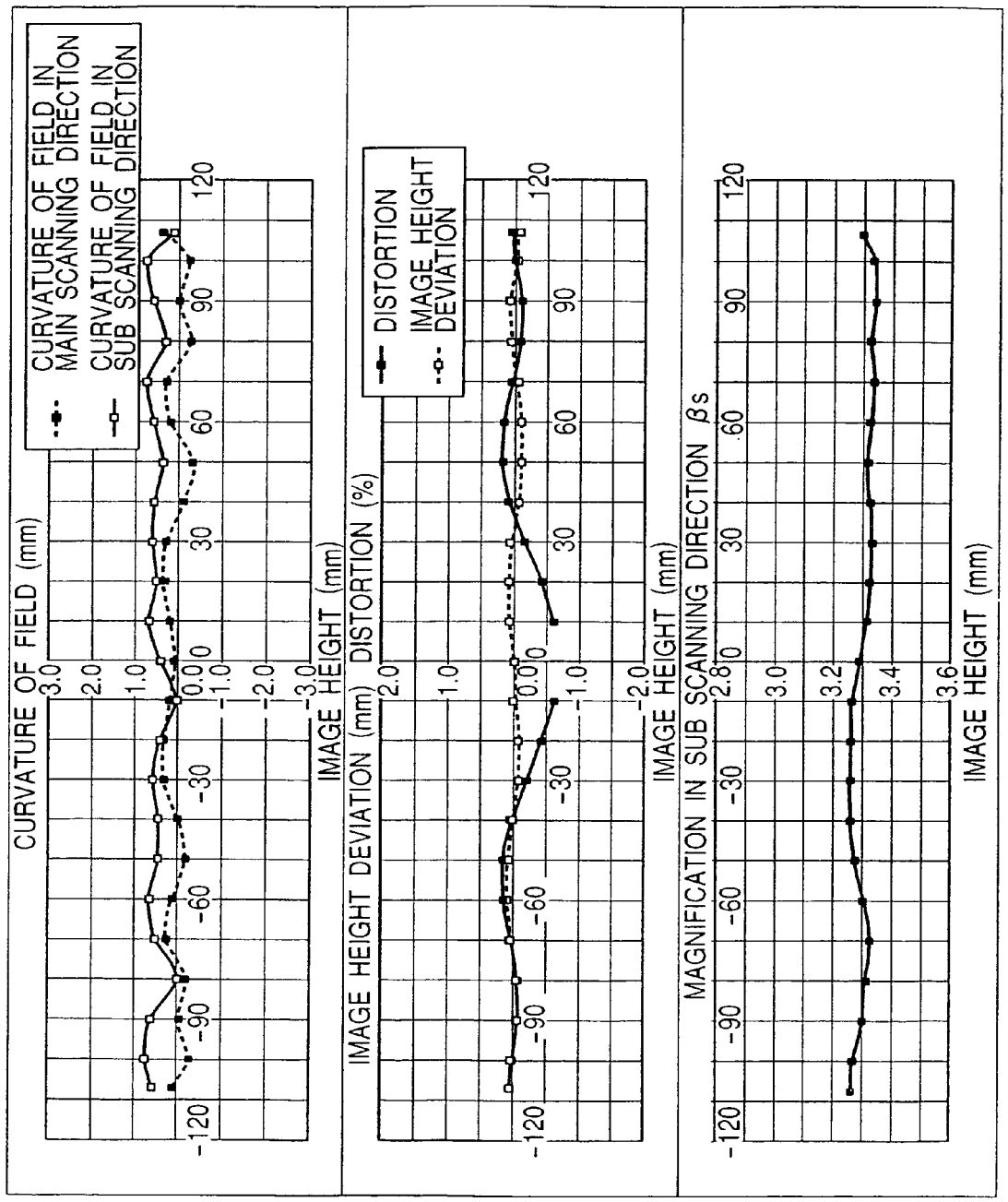
FIG. 6 shows the aberrations of the fθ lens system in Embodiment 1 of the present invention.

FIG. 6 shows the curvatures of image field in the main scanning and sub scanning directions, distortion (the fθ characteristic) and the sub scanning magnification in the present embodiment. In FIG. 6, the + (plus) side of the image height indicates the light source side, and the − (minus) side thereof indicates the opposite side of the light source side. It will be seen that each aberration is corrected to a level practically free of problems. Thereby there can be provided an optical scanning apparatus in which over the entire effective scanning area on the surface 8 to be scanned, the spot diameters in the main scanning and sub scanning directions become uniform and good images can always be obtained.

(A9) When the power of the fθ lens system 9 in the main scanning direction is defined as φm and the power of the second lens 7 in the main scanning direction is defined as φ2m, to satisfy the condition that $$-0.5 \leq \phi 2m/\phi m \leq 0.15 \tag{16}$$

Conditional expression (16) is a condition for constructing the scanning optical means more compactly. If conditional expression (16) is departed from, it will become difficult to construct more compact scanning optical means. If particularly the upper limit value of conditional expression (16) is departed from, it will become difficult to dispose the second lens 7 in proximity to the first lens 6, and if the lower limit value of conditional expression (16) is departed from, the curvature of the first lens 6 will become too sharp and aberration correction in the main scanning direction will become difficult.

Also, the first lens 6 and the second lens 7 are disposed more adjacent to the deflecting means 5 than to the midpoint of the distance from the deflecting surface of the deflecting means 5 to the surface 8 to be scanned.

Embodiment 2

Figure 7A:
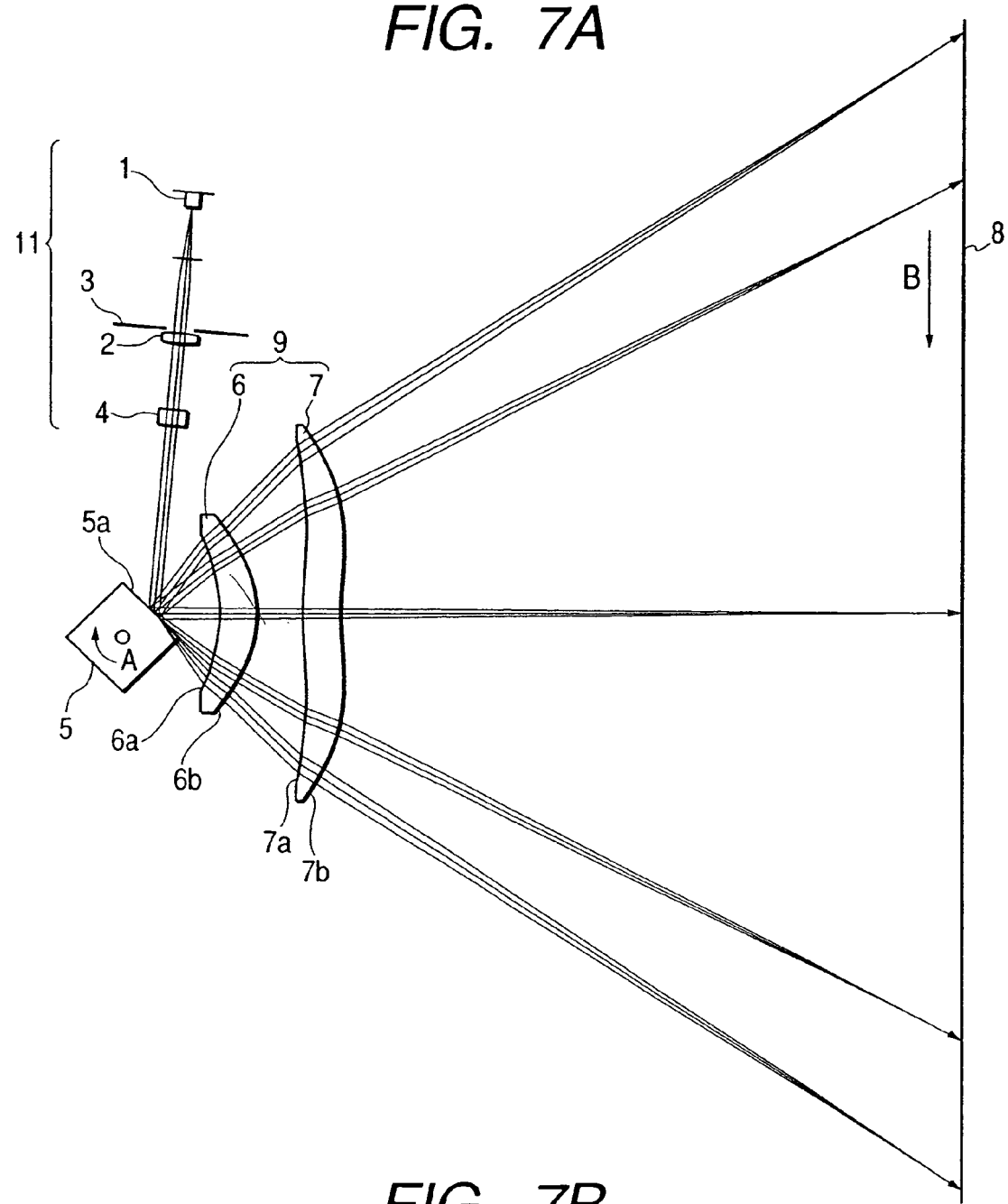
FIGS. 7A and 7B are cross-sectional views of the essential portions of Embodiment 2 of the present invention.
Figure 7B:
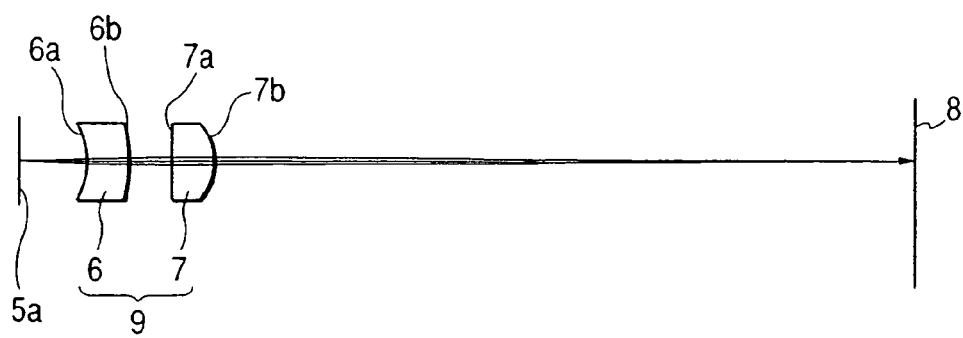

FIG. 7A is a cross-sectional view (main scanning sectional view) of the essential portions of an optical scanning apparatus according to Embodiment 2 of the present invention in the main scanning direction, and FIG. 7B is a cross-sectional view (sub scanning sectional view) of the essential portions of FIG. 7A in the sub scanning direction. In FIGS. 7A and 7B, the same elements as the elements shown in FIGS. 1A and 1B are given the same reference characters.

The difference of the present embodiment from the aforedescribed Embodiment 1 is that the radii of curvature (sagittal shapes R) of the first and second lenses (toric lenses) 6 and 7 in the sub scanning direction are made different from each other. In the other points, the construction and optical action of the present embodiment are substantially similar to those of Embodiment 1, whereby a similar effect is obtained.

That is, in the optical scanning apparatus according to the present embodiment, in the sub scanning section, the first lens 6 is made into a negative meniscus lens having its concave surface facing the polygon mirror 5, and the second lens 7 is made into a positive meniscus lens having its concave surface facing the polygon mirror 5. Thereby, even in a compact scanning optical system wherein the rear side principal plane is positioned more adjacent to the surface 8 to be scanned than to the second lens 7 and the fθ lens system 9 is disposed near the polygon mirror 5 (d=31.4 mm), the sub scanning magnification is restrained to a smaller value, i.e., β=−3.21. Thereby the influence of the degree of sensitivity of the focus fluctuation in the sub scanning direction and the surface inclination of the polygon mirror can be reduced.

When at this time, the radius of curvature of that surface 6*a* of the first lens 6 which faces the polygon mirror 5 in the main scanning direction is defined R1m and the radius of curvature of the aforementioned surface in the sub scanning direction is defined as R1s and the radius of curvature of that surface 6*b* of the first lens 6 which faces the surface 8 to be scanned in the main scanning direction is defined as R2m and the radius of curvature of the aforementioned surface in the sub scanning direction is defined as R2s and the radius of curvature of that surface 7*a* of the second lens 7 which faces the polygon mirror 5 in the main scanning direction is defined as R3m and the radius of curvature of the aforementioned surface in the sub scanning direction is defined as R3s and the radius of curvature of that surface 7*b* of the second lens 7 which faces the surface 8 to be scanned in the main scanning direction is defined as R4m and the radius of curvature of the aforementioned surface in the sub scanning direction is defined as R4s, the conditions that $$R1m < R2m < 0 < R4m < R3m \quad (9)$$

$$R2s < R1s < 0 \quad (10)$$

$$R3s < R4s < 0 \quad (11)$$

$$R1m < R1s < 0 \quad (12)$$

$$R2s < R2m < 0 \quad (13)$$

$$|R4s| < R4m \quad (14)$$

are satisfied.

Conditional expression (9) is a condition for well correcting the curvature of image field in the main scanning direction and the fθ characteristic by the compact fθ lens system 9, and conditional expressions (10) and (11) are conditions for reducing the magnification in the sub scanning direction. Conditional expressions (12), (13) and (14) are conditions effective to satisfy the curvature of image field in the sub scanning direction.

FIG. 8 is an illustration showing variations in the radius R (Rs) of curvature of the surfaces 6*a* and 6*b* of the first lens 6 in the sagittal direction, and FIG. 9 is an illustration showing variations in the radius R (Rs) of curvature of the surfaces 7*a* and 7*b* of the second lens 7 in the sagittal direction. The radii R of curvature in the sagittal direction of the surfaces 6*a* and 6*b* of the first lens 6 are large on the light source side, and are so varied as to become continuously smaller toward the optical axis along the main scanning direction, and as to become still smaller toward the opposite side of the light source side. The radius R of curvature in the sagittal direction of the surface 7*a* of the second lens 7 which faces the polygon mirror 5 is large on the light source means 1 side, and is so varied as to become continuously smaller toward the optical axis along the main scanning direction, and so to become constant from on the optical axis toward the opposite side of the light source side. Also, the radius R of curvature in the sagittal direction of the surface 7*b* of the second lens 7 which faces the surface 8 to be scanned is so varied as to become symmetrically large in the vertical direction across the optical axis (the main scanning direction).

At this time, all surfaces 6*a*, 6*b*, 7*a* and 7*b* of the first and second lenses 6 and 7 are aspherical surfaces of which the sagittal radii R (the radii of curvature in the sagittal direction) are varied away from the optical axis along the main scanning direction, and the sagittal radii R of the both surfaces 6*a* and 6*b* of the first lens 6 and the surface 7*a* of the second lens 7 which faces the polygon mirror 5 are asymmetrically varied in the vertical direction across the optical axis (the main scanning direction), and these surfaces are made into sagittal asymmetrically varying surfaces. Further, the both surfaces 6*a* and 6*b* of the first lens 6 are made into sagittal deformed surfaces of which the sagittal radii R on the light source side are made larger than the sagittal radii R on the optical axis and the sagittal radii R on the opposite side of the light source side are made smaller than those on the optical axis, and that surface 7*a* of the second lens 7 which faces the polygon mirror 5 is made into a sagittal deformed surface of which the sagittal radius R on the light source side is made larger than the sagittal radius R on the optical axis and the sagittal radius R on the opposite side of the light source side is equal (the radius R of curvature in the sagittal direction being constant) to that on the optical axis, and the sides on which the sagittal radii R of the both surfaces 6*a* and 6*b* of the first lens 6 are larger than the sagittal radii R on the optical axis and the sides on which they are smaller than the sagittal radii R on the optical axis are all present on the same side with respect to the optical axis. Also, the sides on which the sagittal radii R of the both surfaces 6*a* and 6*b* of the first lens 6 are larger than the sagittal radii R on the optical axis and the side on which the sagittal radius R of that surface 7*a* of the second lens 7 which faces the polygon mirror 5 is larger than the sagittal radius R on the optical axis coincide with respect to the optical axis. Thereby the curvature of image field in the sub scanning direction and the uniformity of the sub scanning magnification are corrected well.

By "sagittal radius" is here meant the radius of curvature in the sagittal direction.

Table 2 below shows each coefficient representative of the aspherical shape of the fθ lens system 9 in the present embodiment and other characteristics.

Figure 10:
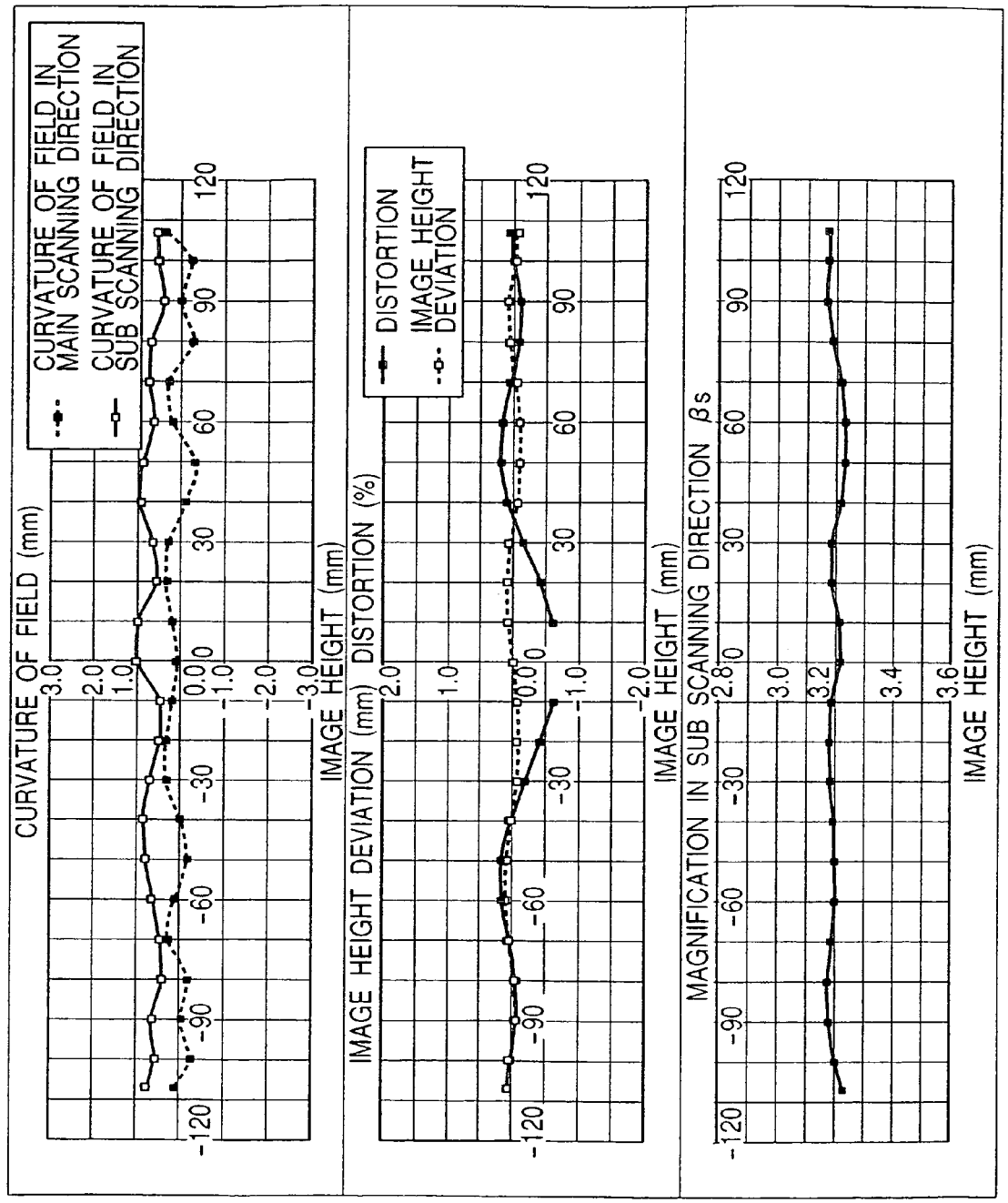
FIG. 10 shows the aberrations of the fθ lens system in Embodiment 2 of the present invention.

FIG. 10 shows the curvature of image field, distortion (fθ characteristic) and sub scanning magnification in the main scanning and sub scanning directions in the present embodiment. In FIG. 10, the + (plus) side of the image height indicates the light source side, and the − (minus) side thereof indicates the opposite side of the light source side. It will be seen that each aberration is corrected to a level practically free of problems. Thereby, over the entire area on the surface 8 to be scanned, the spot diameters in the main scanning and sub scanning directions become uniform, and there can be provided an optical scanning apparatus which can always obtain good images.

Embodiment 3

Figure 11A:
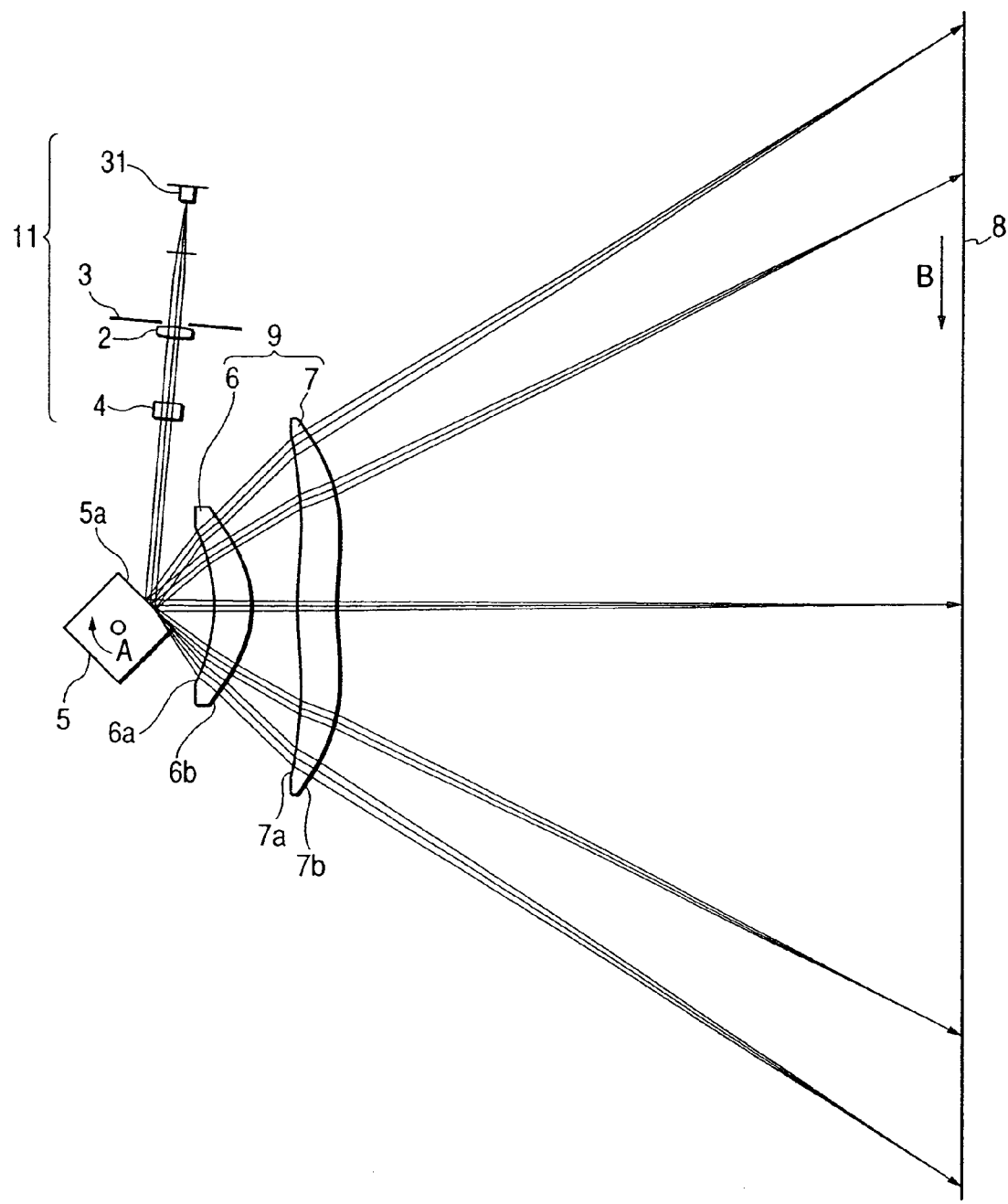
FIGS. 11A, 11B and 11C are cross-sectional views of the essential portions of Embodiment 3 of the present invention.
Figure 11B:
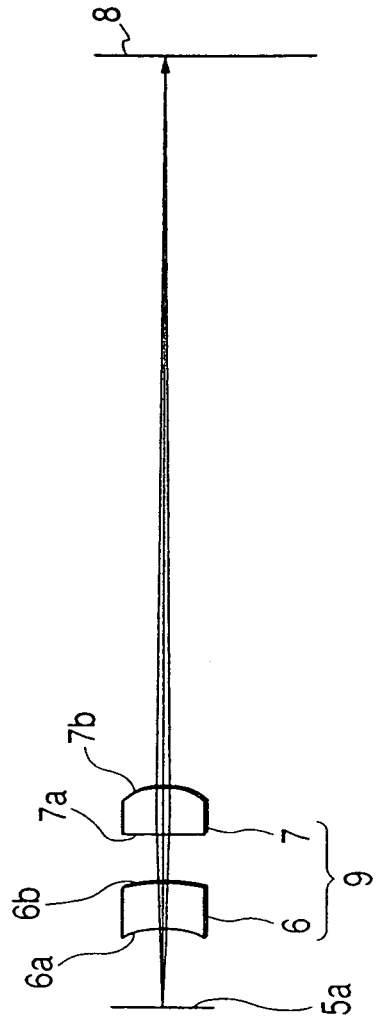

FIG. 11A is a cross-sectional view (main scanning sectional view) of the essential portions of a multibeam scanning apparatus according to Embodiment 3 of the present invention in the main scanning direction, and FIG. 11B is a cross-sectional view (sub scanning sectional view) of the essential portions of FIG. 11A in the sub scanning direction. In FIGS. 11A and 11B, the same elements as the elements shown in FIGS. 7A and 7B are given the same reference characters.

The differences of the present embodiment from the aforedescribed Embodiment 2 are that the light source means 1 is comprised of a multisemiconductor laser emitting two beams, and that the radii of curvature (sagittal radii R) in the sub scanning direction of the first and second lenses (toric lenses) 6 and 7 are made different from each other. In the other points, the construction and optical action of the present embodiment are substantially similar to those of Embodiment 2, whereby a similar effect is obtained.

That is, in the present embodiment, two beams emitted from the semiconductor laser 31 have their quantities of light limited by the aperture stop 3, are converted into substantially parallel beams by the collimator lens 2, and enter the cylindrical lens 4. That part of the substantially parallel beams having entered the cylindrical lens 4 which is in the main scanning section emerges therefrom as it is. In the sub scanning section, the beams are converged and are imaged as substantially linear images (linear images elongated in the main scanning direction) on the deflecting surface 5a of the light deflector 5 by the cylindrical lens 4. The two beams reflected and deflected by the deflecting surface 5a of the light deflector 5 are imaged into spot shapes on the surface 8 of the photosensitive drum through the first and second lenses 6 and 7, and the light deflector 5 is rotated in the direction of arrow A to thereby optically scan the surface 8 of the photosensitive drum at an equal speed in the direction of arrow B (the main scanning direction). Thereby, image recording is effected on the surface 8 of the photosensitive drum as a recording medium.

In an optical scanning apparatus using a multibeam, it is preferable that the pitch interval between lines scanned by respective beams becomes constant, and it is important that the curvature of image field in the sub scanning direction and the sub scanning magnification are uniform at each image height. So, in the present embodiment, the radii of curvature of the first and second lenses 6 and 7 in the sub scanning direction are optimally set as shown in FIGS. 12 and 13.

FIG. 12 is an illustration showing variations in the sagittal radii R (Rs) of the surfaces 6a and 6b of the first lens 6, and FIG. 13 is an illustration showing variations in the sagittal radii R (Rs) of the surfaces 7a and 7b of the second lens 7.

In the present embodiment, as shown in FIGS. 12 and 13, all surfaces 6a, 6b, 7a and 7b of the first and second lenses 6 and 7 constituting the fθ lens system 9 are made into sagittal varying surfaces of which the relation between the sizes of the radii of curvature in the sub scanning direction varies in the vertical direction across the optical axis (the main scanning direction), and sagittal asymmetrically varying surfaces of which the radii of curvature in the sub scanning direction asymmetrically vary in the vertical direction across the optical axis (the main scanning direction).

Table 3 below shows each coefficient representative of the aspherical shape of the fθ lens system 9 in the present embodiment and other characteristics.

Figure 14:
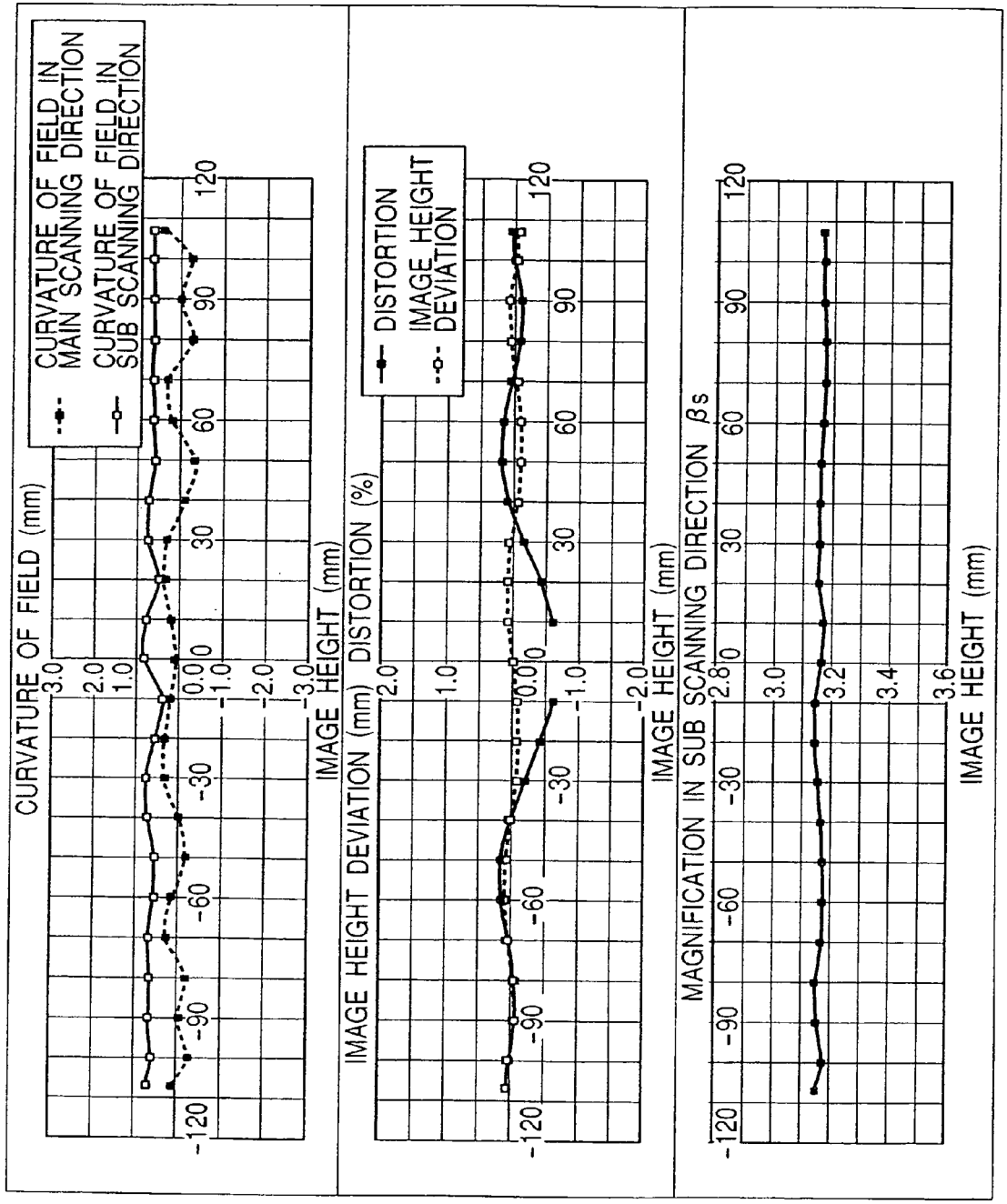
FIG. 14 shows the aberrations of the fθ lens system in Embodiment 3 of the present invention.

FIG. 14 shows curvature of image field in the main scanning and sub scanning directions, distortion (fθ characteristic) and sub scanning magnification in the present embodiment. In FIG. 14, the + (plus) side of the image height indicates the light source side, and the − (minus) side of the image height indicates the opposite side of the light source side. As shown in FIG. 14, the curvature of image field in the sub scanning direction and the fluctuation of the magnification are better corrected, and there can be provided a multibeam scanning apparatus in which an fθ lens system 9 wherein the interval between scanning lines and the spot diameter in the sub scanning direction are always constant is constructed and which is always good.

Embodiment 4

Figure 15A:
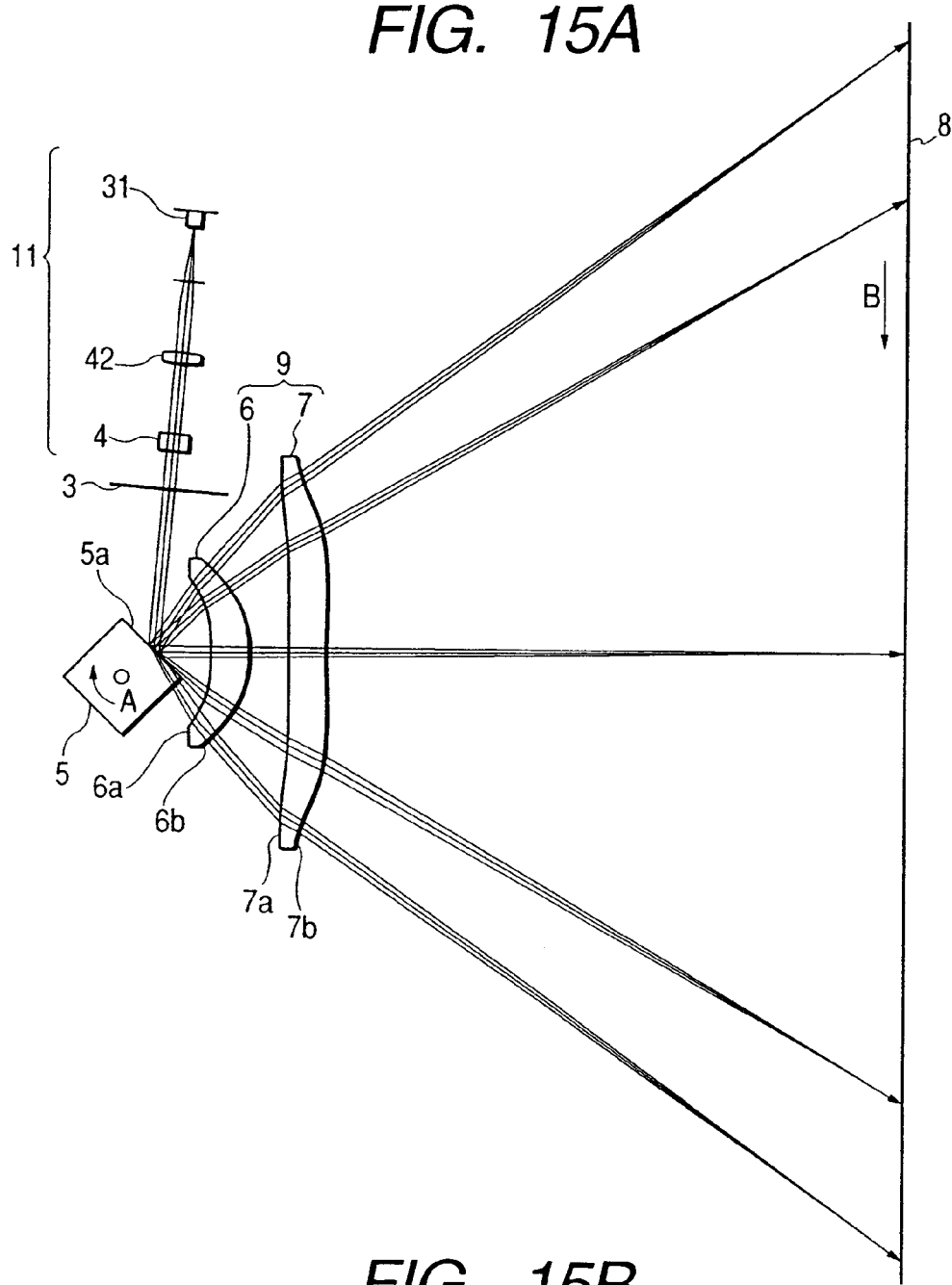
FIGS. 15A and 15B are cross-sectional views of the essential portions of Embodiment 4 of the present invention.
Figure 15B:
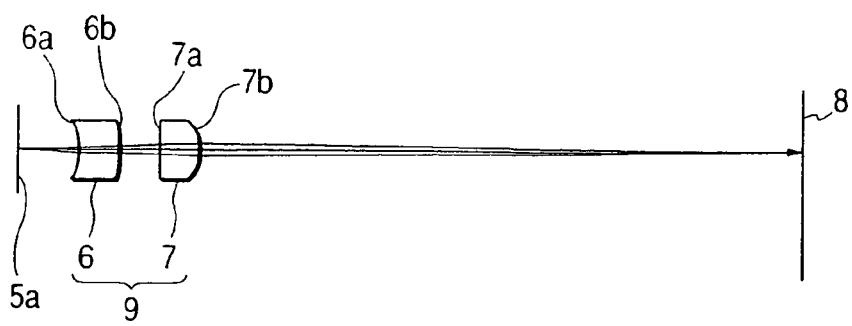

FIG. 15A is a cross-sectional view (main scanning sectional view) of the essential portions of a multibeam scanning apparatus according to Embodiment 4 of the present invention in the main scanning direction, and FIG. 15B is a cross-sectional view (sub scanning sectional view) of the essential portions of FIG. 15A in the sub scanning direction. In FIGS. 15A and 15B, the same elements as the elements shown in FIGS. 11A and 11B are given the same reference characters.

The difference of the present embodiment from the aforedescribed Embodiment 3 is that the two beams emitted from the light source means 31 are weakly converged beams. In the other points, the construction and optical action of the present embodiment are substantially similar to those of Embodiment 3, whereby a similar effect is obtained.

That is, in FIG. 15A, reference numeral 42 designates a condensing lens which converts the two beams emitted from the light source means 31 into weakly converged beams.

In the present embodiment, the two beams emitted from the semiconductor laser 31 have their quantities of light limited by the aperture stop 3, are converted into weakly converged beams by the condensing lens 42, and enter the cylindrical lens 4. That part of the substantially parallel beams having entered the cylindrical lens 4 which is in the main scanning section emerges therefrom as it is. Also, in the sub scanning section, the beams are converged and imaged as substantially linear images (linear images elongated in the main scanning direction) on the deflecting surface 5a of the light deflector 5 by the cylindrical lens 4. The two beams reflected and deflected by the deflecting surface 5a of the light deflector 5 are imaged into spot shapes on the surface 8 of the photosensitive drum through the first and second lenses 6 and 7, and the light deflector 5 is rotated in the direction of arrow A to thereby optically scan the surface 8 of the photosensitive drum at an equal speed in the direction of arrow B (the main scanning direction). Thereby, image recording is effected on the surface 8 of the photosensitive drum as a recording medium.

In the present embodiment, the two beams emitted from the multi-semiconductor laser 31 are converted into weakly converged beams by the condensing lens 42, and are made to share the power of the fθ lens system 9. Also, in the main scanning section, the first lens 6 is made into a positive meniscus lens having its concave surface facing the polygon mirror 5, and the vicinity of the optical axis of the second lens 7 is made into a weak negative meniscus lens having its convex surface facing the polygon mirror 5. Thereby, the distance L (full length) from the deflecting surface 5a of the polygon mirror 5 to the surface 8 to be scanned and the distance d (the lens last surface position) from the deflecting surface 5a of the polygon mirror 5 to that surface 7b of the second lens 7 which faces the surface to be scanned are set compactly.

In the present embodiment, the full length L=130 mm and the lens last surface position d=30.00 mm, and there is provided a multibeam scanning apparatus more compact than the aforedescribed Embodiments 1 to 3.

Again in the present embodiment, as in the aforedescribed Embodiments 1 to 3, the power of the first lens 6 in the main scanning direction is made greater than the power of the second lens 7 in the main scanning direction, to thereby provide a construction which can well correct the curvature of image field characteristic in the main scanning direction and the fθ characteristic even in a compact optical scanning apparatus.

Further, in the present embodiment, each element is set such that when the distance from the deflecting surface 5a of the polygon mirror 5 to the converging point by the condensing lens 42 is defined as S and the fθ coefficient of the fθ lens system 9 is defined k, the condition that $$|S/k| \geq 5 \quad (15)$$

is satisfied.

Conditional expression (15) is a condition for canceling the jitter in the main scanning direction created when the multibeam irradiates the photosensitive drum by the jitter in the main scanning direction by the converged beams. If conditional expression (15) is departed from, the degree of convergence of the beams emitted from the light source means will become severe and the jitter in the main scanning direction by the converged beams will become too great, and it will become impossible to cancel the jitter in the main scanning direction created when the beams are incident on the photosensitive drum.

In the present embodiment, the distance from the deflecting surface 5a of the polygon mirror 5 to the converging point of the converged beams after being transmitted through the condensing lens 42 is S=751 mm, and the fθ coefficient k=109 (mm/rad), and $$|S/k|=6.89,$$

and the above-mentioned conditional expression (15) is satisfied, and the jitter between the two beams created by the converged beams is restrained within a range practically free of problems.

Table 4 below shows each coefficient representative of the aspherical shape of the fθ lens in the present embodiment and other characteristics.

Figure 16:
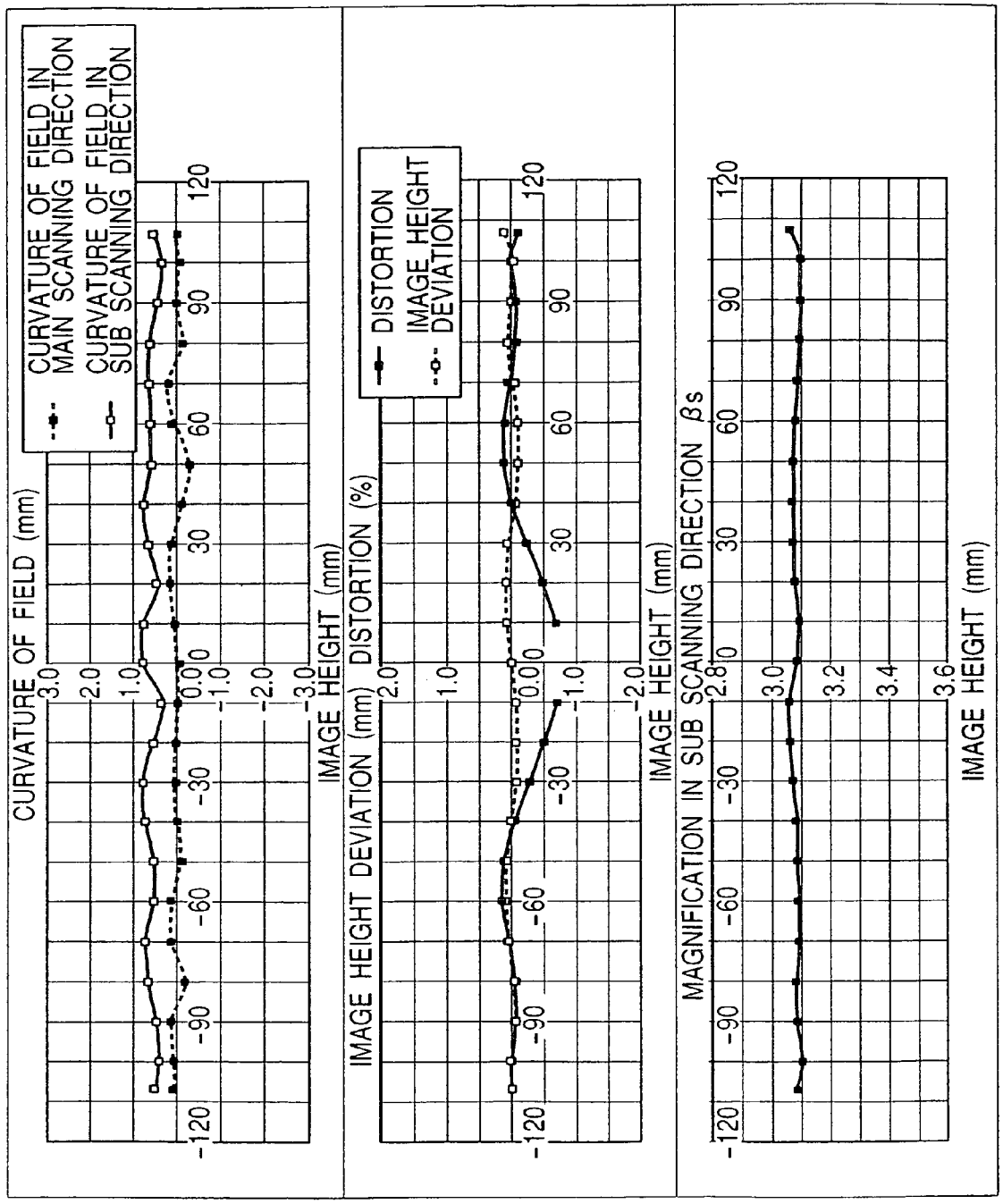
FIG. 16 shows the aberrations of an fθ lens system in Embodiment 4 of the present invention.

FIG. 16 shows curvature of image field in the main scanning and sub scanning directions, distortion (fθ characteristic) and the magnification in the sub scanning direction. In FIG. 16, the + (plus) side of the image height indicates the light source side, and the − (minus) side of the image height indicates the opposite side of the light source side. It will be seen that each aberration is corrected to a level practically free of problems. Thereby, over the entire area on the surface 8 to be scanned, the spot diameters in the main scanning and sub scanning directions become uniform, and there can be provided a multibeam scanning apparatus which can always obtain good images.

Figure 11C:
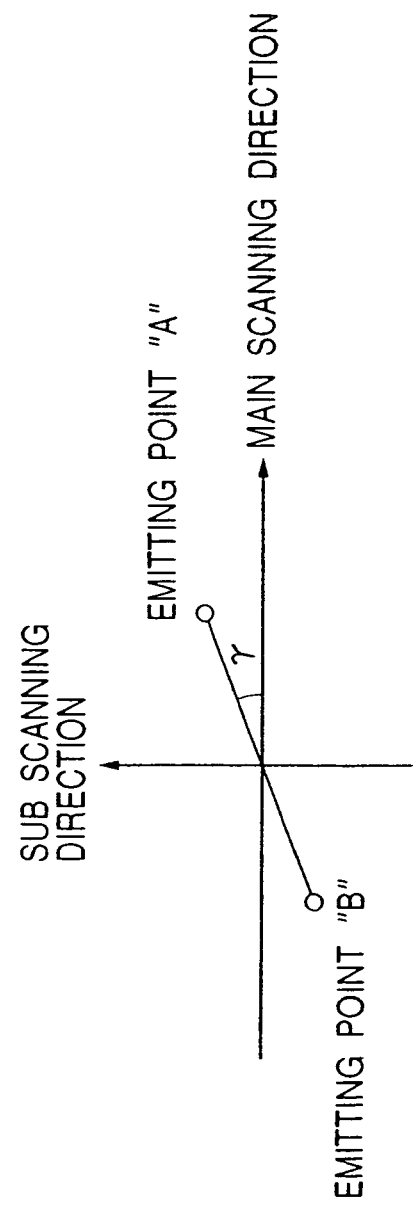

FIG. 11C shows the arrangement of the multisemiconductor laser according to each of Embodiments 3 and 4. As shown in FIG. 1C, two emitting points A and B have intervals in both of the main scanning direction and the sub scanning direction.

The present invention can also be applied to optical means having three or more emitting points.

Embodiment 5

The present invention is not restricted to a two-lens system in which the fθ lens system 9 in Embodiment 2 shown above comprises the first lens 6 and the second lens 7. One or more lenses may be disposed between the first lens 6 and the second lens 7.

That is, the scanning optical means 9 of the present invention may be comprised of three or more lenses.

Figure 19A:
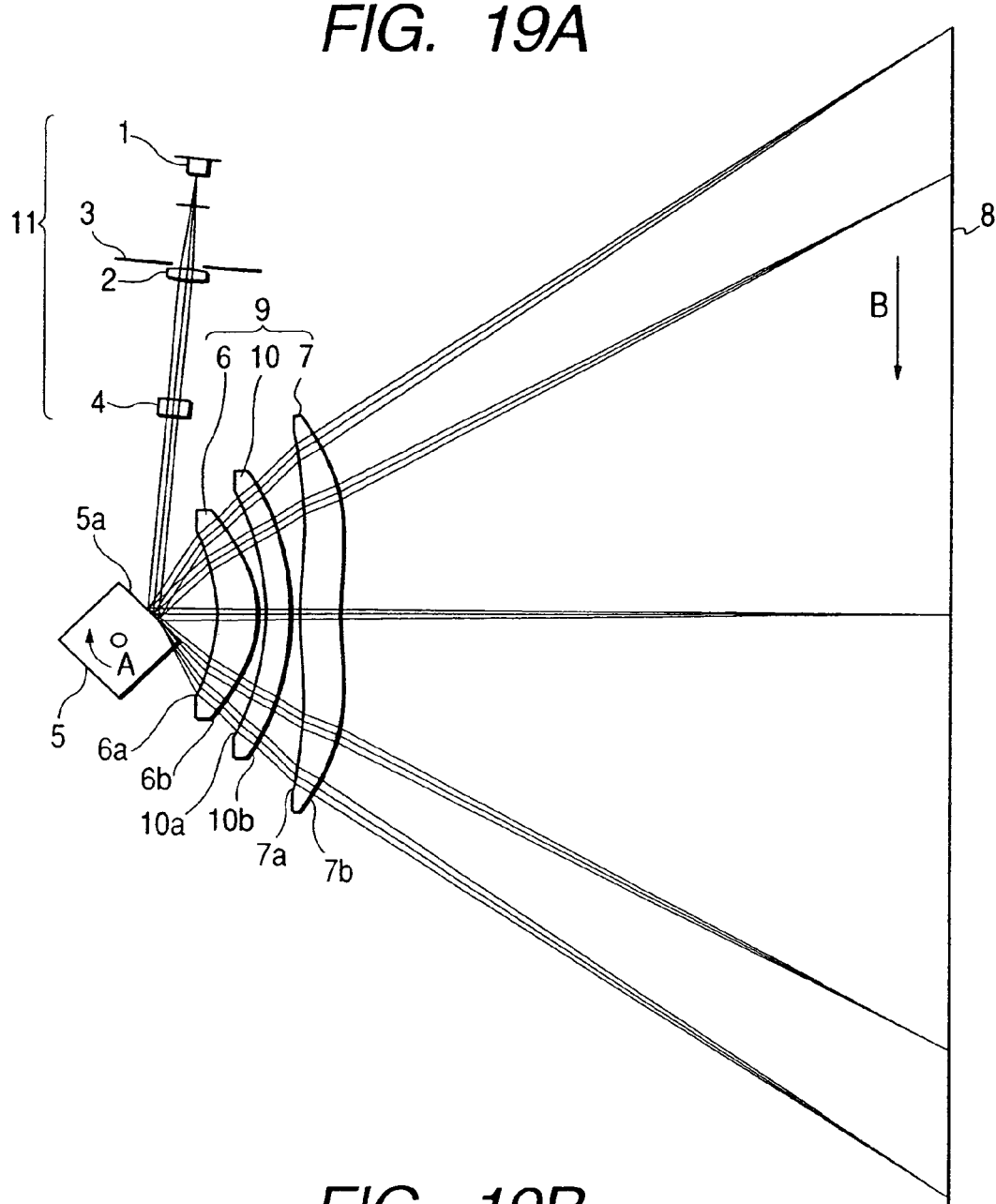
FIGS. 19A and 19B are cross-sectional views of the essential portions of Embodiment 5 of the present invention.
Figure 19B:
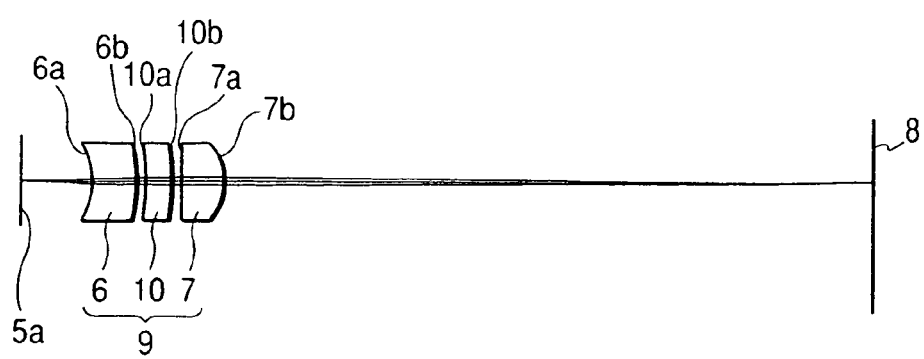

FIGS. 19A and 19B show an example in which the fθ lens system 9 is a three-lens system.

FIG. 19A is a cross-sectional view (main scanning sectional view) of the essential portions of an optical scanning apparatus according to Embodiment 5 of the present invention in the main scanning direction, and FIG. 19B is a cross-sectional view (sub scanning sectional view) of the essential portions of FIG. 19A in the sub scanning direction. In FIGS. 19A and 19B, the same elements as the elements shown in FIGS. 1A and 1B are given the same reference characters.

The difference of the present embodiment from the aforedescribed Embodiment 2 is that a third lens 10 is disposed between the first and second lenses (toric lenses) 6 and 7. In the other points, the construction and optical action of the present embodiment are substantially similar to those of Embodiment 2, whereby a similar effect is obtained.

Also, the first lens 6, the second lens 7 and the third lens 10 are disposed more adjacent to the deflecting means 5 than to the midpoint of the distance from the deflecting surface of the deflecting means 5 to the surface 8 to be scanned.

That is, in the present embodiment, in the main scanning section, the first lens 6 is made into a positive meniscus lens having its concave surface facing the polygon mirror 5, the vicinity of the optical axis of the second lens 7 is made into a meniscus lens having its convex surface facing the polygon mirror 5 and having very little power, and the power of the first lens 6 of the three lenses in the main scanning direction is made greatest, and there is provided a construction which can well correct the curvature of image field characteristic in the main scanning direction and the fθ characteristic even in a compact optical scanning apparatus.

Also, in the sub scanning section, the first lens 6 is made into a negative meniscus lens having its concave surface facing the polygon mirror 5, and the second lens 7 is made into a positive meniscus lens having its concave surface facing the polygon mirror 5. Thereby, even in a compact optical system wherein the rear side principal plane is positioned more adjacent to the surface 8 to be scanned than to the second lens 7 and the fθ lens system 9 is disposed near the polygon mirror 5, the magnification in the sub scanning direction is restrained to a small level. Thereby the degree of sensitivity of focus fluctuation in the sub scanning direction and the influence of the surface inclination of the polygon mirror can be reduced.

If the present invention is designed such that the first lens 6 nearest to the polygon mirror 5 has positive power in the main scanning direction and has negative power in the sub scanning direction, and of the three lenses 6, 7 and 10, the power of the first lens 6 nearest to the deflecting means 5 in the main scanning direction is made greatest and the second lens 7 nearest to the surface 8 to be scanned has positive power in the sub scanning direction, even if the fθ lens system 9 is brought close to the deflecting means 5, the position of the principal plane of the fθ lens system 9 can be brought to the surface 8 to be scanned side, and there can be realized a compact optical scanning apparatus in which the sub scanning magnification is restrained low.

That is, assuming k which downsizes the fθ lens system 9 by shortening the distance from the polygon mirror 5 to the front side principal plane of the fθ lens system 9, it is preferable that of the three lenses, the power of the first lens 6 nearest to the polygon mirror 5 in the main scanning direction be greatest, and in the sub-scanning direction, it is preferable as a construction which reduces the degree of eccentric sensitivity of the downsized fθ lens system 9 in the sub scanning direction that negative power be given to the first lens and positive power be given to the second lens.

Also, the third lens 10 having power in at least one of the main scanning direction and the sub scanning direction may be replaced by a mirror having at least power in one of the main scanning direction and the sub scanning direction or a diffraction optical element having at least power in one of the main scanning direction and the sub scanning direction.

The present embodiment can also be applied to a multi-semiconductor laser.

Also in the present Embodiment 5, the conditional expressions (3), (4), (5), (6) and (9) to (14) of Embodiment 1 hold true.

Again in the construction of Embodiment 5 as described above, an effect similar to that of Embodiment 2 is obtained.

Further, when as shown in FIGS. 19A and 19B, the first lens 6, the second lens 7 and the third lens 10 are disposed more adjacent to the deflecting means 5 than to the midpoint of the distance from the deflecting surface of the deflecting means 5 to the surface 8 to be scanned, the conditional expressions (7) and (8) of Embodiment 1 are also satisfied in the present Embodiment 5.

Embodiment 6

The present invention is not restricted to a two-lens system in which the scanning optical means 9 of Embodiments 1 to 4 shown above comprises the first lens 6 and the second lens 7. One of the first lens 6 and the second lens 7 in Embodiments 1 to 4 may be replaced by a mirror having at least power in one of the main scanning direction and the sub scanning direction or a diffraction optical element having at least power in one of the main scanning direction and the sub scanning direction.

Also, both of the first lens 6 and the second lens 7 may be replaced by reflecting mirrors or diffraction optical elements.

That is, in the scanning optical means, the first optical element nearest to the deflecting means 5 is not limited to the first lens 6, but may be a mirror or a diffraction optical element if it has positive power in the main scanning direction and has negative power in the sub scanning direction. The second optical element nearest to the surface 8 to be scanned is not limited to the second lens 7, but may be a mirror or a diffraction optical element if it has positive power in the sub scanning direction.

However, the power of the first optical element nearest to the deflecting means 5 in the main scanning direction need be greatest.

Further, the scanning optical means of the present invention is not limited to a two-lens system comprising the first optical element and the second optical element.

As in Embodiment 5, one or more mirrors having at least power in one of the main scanning direction and the sub scanning direction or an optical element having a diffraction optical element having at least power in one of the main scanning direction and the sub scanning direction or a lens having at least power in one of the main scanning direction and the sub scanning direction may be disposed between the first optical element and the second optical element.

Again in the construction of Embodiment 6 as described above, an effect similar to that of Embodiment 1 is obtained.

Also, in the present embodiment, the first optical element and the second optical element can be disposed between the deflecting means 5 and the surface to be scanned, and are not restricted to a form in which the first optical element and the second optical element are disposed more adjacent to the deflecting means 5 than to the midpoint of the distance from the deflecting surface of the deflecting means 5 to the surface 8 to be scanned. The present invention can also be applied to a form in which the second optical element nearest to the surface to be scanned is disposed more adjacent to the surface 8 to be scanned than to the midpoint of the distance from the deflecting surface of the deflecting means 5 to the surface 8 to be scanned.

Preferably, however, when the effect of a reduction in the sub scanning magnification is taken into consideration, the effect of the present invention is obtained more remarkably in a form wherein the first optical element and the second optical element are disposed more adjacent to the deflecting means 5 than to the midpoint of the distance from the deflecting surface of the deflecting means 5 to the surface 8 to be scanned.

Again in the present Embodiment 6, the conditional expressions (3), (4), (5) and (6) of Embodiment 1 hold true.

Further, when the first optical element and the second optical element are disposed more adjacent to the deflecting means 5 than to the midpoint of the distance from the deflecting surface of the deflecting means 5 to the surface 8 to be scanned, the conditional expressions (7) and (8) of Embodiment 1 are satisfied again in the present Embodiment 6.

If the first optical element nearest to the deflecting means 5 is a diffraction optical element, in order to correct the curvature of image field in the main scanning direction, it is preferable that when the power of that diffracting surface of the diffraction optical element which faces the deflecting means 5 in the main scanning direction is defined as $\phi d1$ and the power of that diffracting surface of the diffraction optical element which faces the surface 8 to be scanned in the main scanning direction is defined as $\phi d2$, the conditions that $$\phi d1 \times \phi d2 < 0$$

$$|\phi d2| > |\phi d1|$$

be satisfied.

(Image Forming Apparatus)

Figure 17:
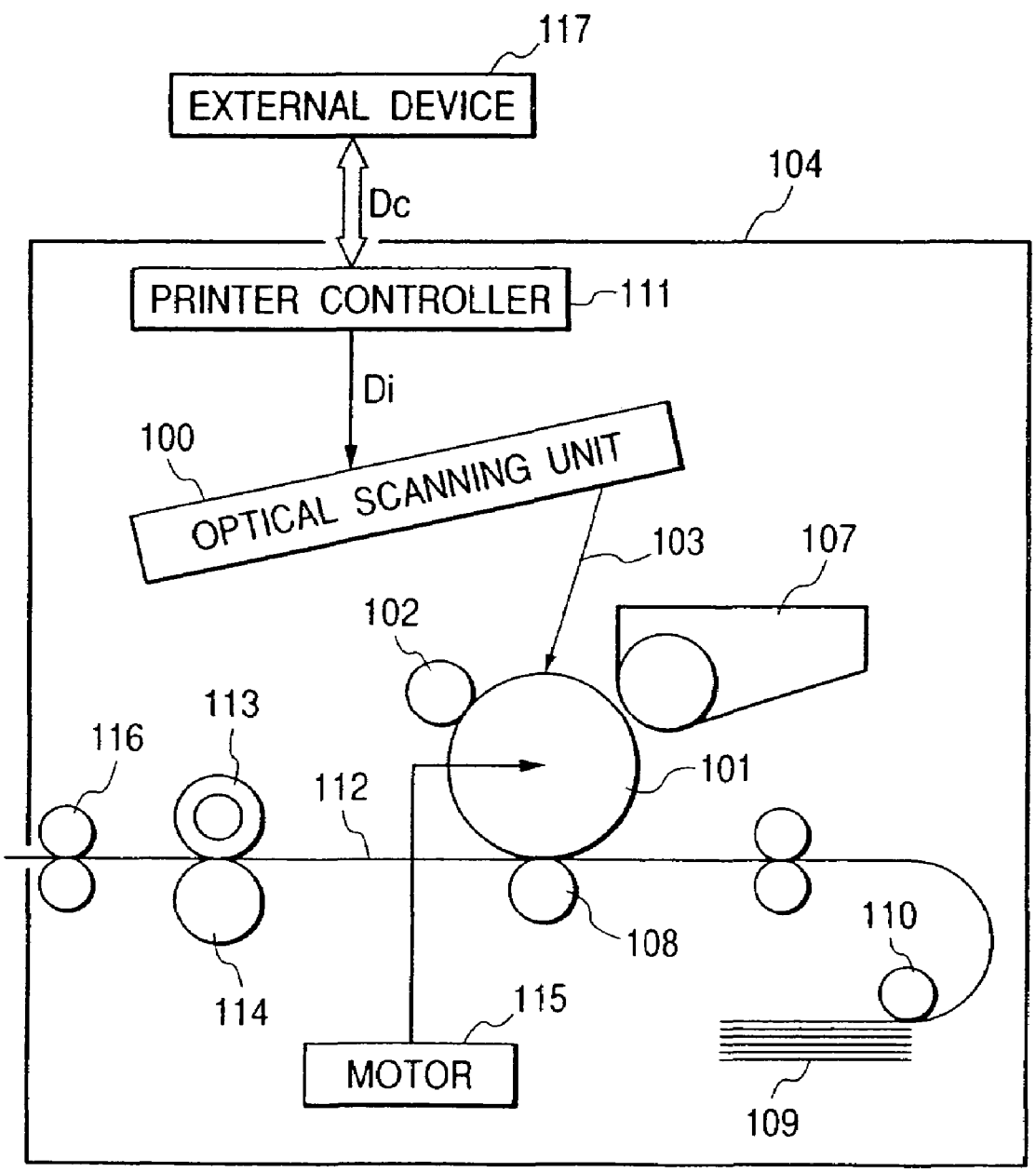
FIG. 17 is a cross-sectional view of essential portions showing an example of the construction of an electrophotographic printer using the optical scanning optical system of the present invention.
Figure 18:
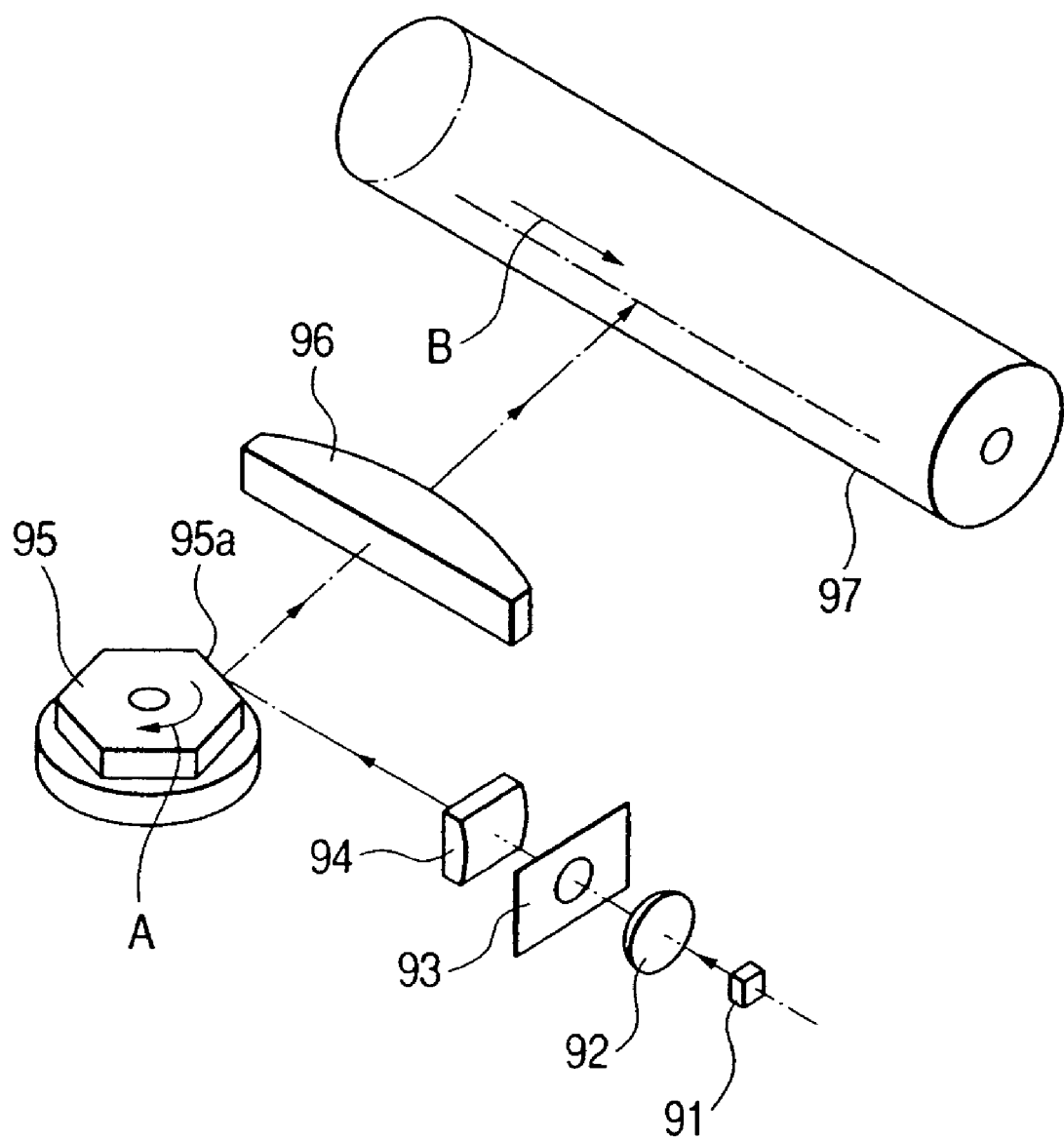
FIG. 18 is a schematic view of the essential portions of an optical scanning apparatus according to the prior art.

FIG. 17 is a cross-sectional view of essential portions in the sub scanning direction showing an embodiment of the image forming apparatus of the present invention. In FIG. 17, reference numeral 104 designates the image forming apparatus. Code data Dc is inputted from a external device 117 such as a personal computer to this image forming apparatus 104. This code data Dc is converted into image data (dot data) Di by a printer controller 111 in the apparatus. This image data Di is inputted to an optical scanning unit 100 having the construction shown in Embodiments 1 to 6. A light beam 103 modulated in conformity with the image data Di is emitted from this optical scanning unit 100, and the photosensitive surface of a photosensitive drum 101 is scanned in the main scanning direction by this light beam 103.

The photosensitive drum 101 which is an electrostatic latent image bearing member (photosensitive member) is clockwisely rotated by a motor 115. With this rotation, the photosensitive surface of the photosensitive drum 101 moves relative to the light beam 103 in the sub scanning direction orthogonal to the main scanning direction. Above the photosensitive drum 101, a charging roller 102 for uniformly charging the surface of the photosensitive drum 101 is provided so as to contact with that surface. The light beam 103 scanned by the optical scanning unit 100 may be applied to the surface of the photosensitive drum 101 charged by the charging roller 102.

As previously described, the light beam 103 is modulated on the basis of the image data Di, and by this light beam 103 being applied to the surface of the photosensitive drum 101, an electrostatic latent image is formed on the surface of the photosensitive drum 101. This electrostatic latent image is developed as a toner image by a developing device 107 disposed so as to abut against the photosensitive drum 101 further downstream of the applied position of the light beam 103 with respect to the direction of rotation of the photosensitive drum 101.

The toner image developed by the developing device 107 is transferred to paper 112 which is a transfer material by a transfer roller 108 disposed below the photosensitive drum 101 so as to be opposed to the photosensitive drum 101. The paper 112 is contained in a paper cassette 109 disposed forwardly (rightwardly as viewed in FIG. 17) of the photosensitive drum 101, but can also be manually fed. A feed roller 110 is disposed on one end portion of the paper cassette 109, and feeds the paper 112 in the paper cassette 109 into a conveying path.

The paper 112 to which the unfixed toner image has been transferred in the manner described above is further conveyed to a fixing device disposed rearwardly (leftwardly as viewed in FIG. 17) of the photosensitive drum 101. The fixing device is comprised of a fixing roller 113 having a fixing heater (not shown) therein and a pressure roller 114 disposed so as to be brought into pressure contact with this fixing roller 113, and heats the paper 112 conveyed thereto from the transferring portion while pressurizing the paper by the pressure contact portion between the fixing roller 113 and the pressure roller 114 to thereby fix the unfixed toner image on the paper 112. Paper discharge rollers 116 are disposed rearwardly of the fixing roller 113, and discharge the fixed paper 112 out of the image forming apparatus.

Although not shown in FIG. 17, the printer controller 111 effects not only the conversion of the data previously described, but also the control of various portions in the image forming apparatus including the motor 115, and a polygon motor, etc. in the optical scanning unit which will be described later.

According to the present invention, as previously described, when the beam emitted from the light source means is to be imaged on the surface to be scanned by the scanning optical means having a plurality of lenses through the deflecting means, the shapes of the plurality of lenses are appropriately set, whereby the curvature of image field and distortion in the main scanning direction and the curvature of image field and the fluctuation of the magnification in the sub scanning direction can be corrected well, and thereby there can be achieved an optical scanning apparatus which, in spite of a compact construction, is suited for highly definite printing in which the sub scanning magnification is restrained low, and an image forming apparatus using the same.

Particularly, according to certain aspects of the invention, the uniformity of the curvature of image field in the main scanning and sub scanning directions, the fθ characteristic and the sub scanning magnification can be corrected well and the sub scanning magnification can be restrained small and the degree of sensitivity to the focus fluctuation in the sub scanning direction can be reduced.

Further, the curvature of image field in the main scanning direction and the fθ characteristic can be corrected well, and in a compact optical scanning apparatus as well, the aforedescribed aberrations can likewise be corrected well.

According to certain aspects of the invention, the curvature of image field in the main scanning direction and the fθ characteristic can be corrected well, and in a compact optical scanning apparatus as well, the aforedescribed aberrations can likewise be corrected well.

According to certain aspects of the invention, the curvature of image field in the main scanning direction and the fθ characteristic can be better corrected, and in a compact optical scanning apparatus as well, the aforedescribed aberrations can likewise be corrected well.

According to certain aspects of the invention, the curvature of image field characteristic in the main scanning direction by the deflecting means and the asymmetry of the fθ characteristic can be corrected.

According to certain aspects of the invention, the effect of the correction of the curvature of image field characteristic in the main scanning direction by the deflecting means and the asymmetry of the fθ characteristic can be made great.

According to certain aspects of the invention, the curvature of image field characteristic in the sub scanning direction by the deflecting means and the asymmetry of the sub scanning magnification can be corrected.

According to certain aspects of the invention, the effect of the correction of the curvature of image field characteristic in the sub scanning direction by the deflecting means and the asymmetry of the sub scanning magnification can be made great.

According to certain aspects of the invention, over two or more surfaces, the radii of curvature in the sub scanning direction are bent in the same direction, whereby the effect of the correction of the curvature of image field characteristic in the sub scanning direction by the deflecting means and the asymmetry of the sub scanning magnification can be made great.

According to certain aspects of the invention, the effect of the correction of the curvature of image field characteristics in the main scanning and sub scanning directions by the deflecting means and the asymmetry of the fθ characteristic and the sub scanning magnification can be made great.

According to certain aspects of the invention, the curvature of image field and the fθ characteristic in a wide field angle area in the main scanning direction can be satisfied.

According to certain aspects of the invention, the jitter by the eccentricity of the deflecting means can be corrected.

According to certain aspects of the invention, the jitter in the main scattering direction occurring when the multibeam is applied onto the photosensitive drum can be canceled by the jitter in the main scanning direction by the converged beam.

TABLE 1

Construction of Optical Scanning Apparatus

| fθ coefficient | | | Meridional shape of fθ lens 6 | | | Meridional shape of fθ lens 7 | | |
|---|---|---|---|---|---|---|---|---|
| fθ coefficient Wavelength & Refractive index | k | 109 | First surface 6a Light source side | Second surface 6b Light source side | | First surface 7a Light source side | Second surface 7b Light source side | |
| Wavelength used | λ (nm) | 780 | R | −2.64814E+01 | −1.97526E+01 | R | 8.47991E+01 | 8.25696E+01 |
| Refractive index of fθ lens 6a | N1 | 1.5242 | K | −1.49902E+00 | −8.11549E−01 | K | −8.42997E+00 | −8.26049E−01 |
| Refractive index of fθ lens 6b | N2 | 1.5242 | B4 | 2.62745E−05 | 1.30249E−05 | B4 | −1.54001E−05 | −2.19243E−05 |
| Disposition of imaging optical system | | | B6 | −5.63823E−08 | 3.59039E−08 | B6 | 1.37412E−08 | 2.45322E−08 |
| Reflecting surface 5a of polygon mirror - Incidence surface 6a of lens 6 | d1 | 10.50 | B8 | 0.00000E+00 | −9.03558E−11 | B8 | −2.69944E−12 | −2.67301E−11 |
| Incidence surface 6a of lens 6 - Emergence surface 6b of lens 6 | d2 | 6.50 | B10 | 0.00000E+00 | 0.00000E+00 | B10 | −2.15513E−15 | 2.10166E−14 |
| Emergence surface 6b of lens 6 - Incidence surface 7a of lens 7 | d3 | 7.12 | B12 | 0.00000E+00 | 0.00000E+00 | B12 | 7.93243E−19 | −8.35950E−18 |
| Incidence surface 7a of lens 7 - Emergence surface 7b of lens 7 | d4 | 6.60 | B14 | 0.00000E+00 | 0.00000E+00 | B14 | 0.00000E+00 | 1.04822E−21 |
| Emergence surface 7b of lens 7 - Scanned surface 8 | d5 | 103.28 | B16 | 0.00000E+00 | 0.00000E+00 | B16 | 0.00000E+00 | 0.00000E+00 |
| | | | | Opposite side of light source | Opposite side of light source | | Opposite side of light source | Opposite side of light source |
| Effective scanning width | W | 214.00 | R | −2.64814E+01 | −1.97526E+01 | R | 8.47991E+01 | 8.25696E+01 |
| k/W | k/W | 0.51 | K | −1.49902E+00 | −8.11549E−01 | K | −8.42997E+00 | −8.26049E−01 |
| Reflecting surface 5a of polygon mirror - Scanned surface 8 | L | 134.00 | B4 | 2.62745E−05 | 1.22213E−05 | B4 | −1.71719E−05 | −2.31502E−05 |
| L/W | L/W | 0.63 | B6 | −5.63823E−08 | 4.20274E−08 | B6 | 1.72463E−08 | 2.67547E−08 |
| Reflecting surface 5a of polygon mirror- Last lens surface (7b) | d | 30.72 | B8 | 0.00000E+00 | −9.98223E−11 | B8 | −4.67025E−12 | −2.92126E−11 |
| d/W | d/W | 0.14 | B10 | 0.00000E+00 | 0.00000E+00 | B10 | −1.99776E−15 | 2.29436E−14 |
| d/L | d/L | 0.23 | B12 | 0.00000E+00 | 0.00000E+00 | B12 | 7.71718E−19 | −8.50899E−18 |
| Reflecting surface 5a of polygon mirror - Converging point | S | ∞ | B14 | 0.00000E+00 | 0.00000E+00 | B14 | 0.00000E+00 | 6.12529E−22 |
| S/k | S/k | ∞ | B16 | 0.00000E+00 | 0.00000E+00 | B16 | 0.00000E+00 | 0.00000E+00 |

| fθ coefficient | | | Sagittal shape of fθ lens 6 | | | Sagittal shape of fθ lens 7 | | |
|---|---|---|---|---|---|---|---|---|
| fθ coefficient Wavelength & Refractive index | k | 109 | First surface 6a Light source side | Second surface 6b Light source side | | First surface 7a Light source side | Second surface 7b Light source side | |
| Wavelength used | λ (nm) | 780 | Rs | −1.00000E+01 | −2.29499E+01 | Rs | 1.10239E+02 | −1.21165E+01 |
| Refractive index of fθ lens 6a | N1 | 1.5242 | D2 | 2.63067E−02 | 1.47722E−02 | D2 | −1.99425E−03 | 8.77097E−04 |
| Refractive index of fθ lens 6b | N2 | 1.5242 | D4 | 0.00000E+00 | 3.08830E−04 | D4 | 1.75886E−06 | −1.64862E−07 |
| Disposition of imaging optical system | | | D6 | 0.00000E+00 | −1.73594E−06 | D6 | 3.46396E−09 | −5.74619E−10 |
| Reflecting surface 5a of polygon mirror - Incidence surface 6a of lens 6 | d1 | 10.50 | D8 | 0.00000E+00 | 8.00000E−09 | D8 | −5.68302E−12 | 2.76480E−13 |
| Incidence surface 6a of lens 6 - Emergence surface 6b of lens 6 | d2 | 6.50 | D10 | 0.00000E+00 | 0.00000E+00 | D10 | 2.59258E−15 | 1.07548E−17 |
| Emergence surface 6b of lens 6 - Incidence surface 7a of lens 7 | d3 | 7.12 | | | | | | |
| Incidence surface 7a of lens 7 - Emergence surface 7b of lens 7 | d4 | 6.60 | | | | | | |
| Emergence surface 7b of lens 7 - Scanned surface 8 | d5 | 103.28 | | | | | | |

TABLE 1-continued

Construction of Optical Scanning Apparatus

| | | | | Opposite side of light source | Opposite side of light source | | Opposite side of light source | Opposite side of light source |
|---|---|---|---|---|---|---|---|---|
| Effective scanning width | W | 214.00 | Rs | −1.00000E+01 | −2.29499E+01 | Rs | 1.10239E+02 | −1.21165E+01 |
| k/W | k/W | 0.51 | D2 | −2.31826E−05 | −7.34807E−03 | D2 | 1.21554E−02 | 1.47125E−03 |
| Reflecting surface 5a of polygon mirror - Scanned surface 8 | L | 134.00 | D4 | 0.00000E+00 | 3.58156E−05 | D4 | −4.04597E−05 | −1.76419E−06 |
| L/W | d/W | 0.63 | D6 | 0.00000E+00 | 1.37598E−09 | D6 | 2.65384E−08 | 3.06914E−10 |
| Reflecting surface 5a of polygon mirror - Last lens surface (7b) | d | 30.72 | D8 | 0.00000E+00 | −4.33909E−10 | D8 | 8.82800E−11 | 6.59775E−13 |
| d/W | d/W | 0.14 | D10 | 0.00000E+00 | 7.82590E−13 | D10 | −7.90570E−14 | −1.93463E−16 |
| d/L | d/L | 0.23 | | | | | | |
| Reflecting surface 5a of polygon mirror - Converging point | S | ∞ | | | | | | |
| S/k | S/k | ∞ | | | | | | |
| Power of fθ lens system 9 in main scanning direction | φm3 | 0.00923 | | | | | | |
| Power of lens 6 in main scanning direction | φ1 m | 0.00898 | | | | | | |
| Power of lens 7 in main scanning direction | φ2 m | 3.03E−06 | | | | | | |
| φ1 m/φ m | | 0.974 | | | | | | |
| Power of fθ lens system 9 in sub scanning direction | φs | 0.04599 | | | | | | |
| Power of lens 6 in sub scanning direction | φ1 s | −0.02447 | | | | | | |
| Power of lens 7 in sub scanning direction | φ2 s | 0.04713 | | | | | | |
| φs1/φs2 | | −0.519 | | | | | | |

TABLE 2

Construction of Optical Scanning Apparatus

| fθ coefficient | | | Meridional shape of fθ lens 6 | | | Meridional shape of fθ lens 7 | |
|---|---|---|---|---|---|---|---|
| fθ coefficient Wavelength & Refractive index | k | 109 | First surface 6a Light source side | Second surface 6b Light source side | | First surface 7a Light source side | Second surface 7b Light source side |
| Wavelength used | λ (nm) | 780 | R −2.64814E+01 | −1.97526E+01 | R | 8.47991E+01 | 8.25696E+01 |
| Refractive index of fθ lens 6a | N1 | 1.5242 | K −1.49902E+00 | −8.11549E−01 | K | −8.42997E+00 | −8.26049E−01 |
| Refractive index of fθ lens 6b | N2 | 1.5242 | B4 2.62745E−05 | 1.30249E−05 | B4 | −1.54001E−05 | −2.19243E−05 |
| Disposition of imaging optical system | | | B6 −5.63823E−08 | 3.59039E−08 | B6 | 1.37412E−08 | 2.45322E−08 |
| Reflecting surface 5a of polygon mirror - Incidence surface 6a of lens 6 | d1 | 10.50 | B8 0.00000E+00 | −9.03558E−11 | B8 | −2.69944E−12 | −2.67301E−11 |
| Incidence surface 6a of lens 6 - Emergence surface 6b of lens 6 | d2 | 6.50 | B10 0.00000E+00 | 0.00000E+00 | B10 | −2.15513E−15 | 2.10166E−14 |
| Emergence surface 6b of lens 6 - Incidence surface 7a of lens 7 | d3 | 7.12 | B12 0.00000E+00 | 0.00000E+00 | B12 | 7.93243E−19 | −8.35950E−18 |
| Incidence surface 7a of lens 7 - Emergence surface 7b of lens 7 | d4 | 6.60 | B14 0.00000E+00 | 0.00000E+00 | B14 | 0.00000E+00 | 1.04822E−21 |
| Emergence surface 7b of lens 7 - Scanned surface 8 | d5 | 103.28 | B16 0.00000E+00 | 0.00000E+00 | B16 | 0.00000E+00 | 0.00000E+00 |
| | | | Opposite side of light source | Opposite side of light source | | Opposite side of light source | Opposite side of light source |
| Effective scanning width | W | 214.00 | R −2.64814E+01 | −1.97526E+01 | R | 8.47991E+01 | 8.25696E+01 |
| k/W | k/W | 0.51 | K −1.49902E+00 | −8.11549E−01 | K | −8.42997E+00 | −8.26049E−01 |
| Reflecting surface 5a of polygon minor - Scanned surface 8 | L | 134.00 | B4 2.62745E−05 | 1.22213E−05 | B4 | −1.71719E−05 | −2.31502E−05 |
| L/W | d/W | 0.63 | B6 −5.63823E−08 | 4.20274E−08 | B6 | 1.72463E−08 | 2.67547E−08 |

TABLE 2-continued

Construction of Optical Scanning Apparatus

| | | | | | | | |
|---|---|---|---|---|---|---|---|
| Reflecting surface 5a of polygon mirror- Last lens surface (7b) | d | 30.72 | B8 | 0.00000E+00 | −9.98223E−11 | B8 −4.67025E−12 | −2.92126E−11 |
| d/W | d/W | 0.14 | B10 | 0.00000E+00 | 0.00000E+00 | B10 −1.99776E−15 | 2.29436E−14 |
| d/L | d/L | 0.23 | B12 | 0.00000E+00 | 0.00000E+00 | B12 7.71718E−19 | −8.50899E−18 |
| Reflecting surface 5a of polygon mirror - Converging point | S | ∞ | B14 | 0.00000E+00 | 0.00000E+00 | B14 0.00000E+00 | 6.12529E−22 |
| S/k | S/k | ∞ | B16 | 0.00000E+00 | 0.00000E+00 | B16 0.00000E+00 | 0.00000E+00 |

| fθ coefficient | | | Sagittal shape of fθ lens 6 | | Sagittal shape of fθ lens 7 | |
|---|---|---|---|---|---|---|
| fθ coefficient | k | 109 | First surface 6a Light source side | Second surface 6b Light source side | First surface 7a Light source side | Second surface 7b Light source side |
| Wavelength & Refractive index | | | | | | |
| Wavelength used | λ (nm) | 780 | Rs −1.16033E+01 | −2.99977E+01 | Rs −7.88803E+01 | −1.00571E+01 |
| Refractive index of fθ lens 6a | N1 | 1.5242 | D2 1.66782E−02 | 4.74335E−02 | D2 4.13213E−02 | 1.77203E−03 |
| Refractive index of fθ lens 6b | N2 | 1.5242 | D4 −2.05511−05 | −7.89235E−04 | D4 −3.82144E−05 | −4.56816E−06 |
| Disposition of imaging optical system | | | D6 0.00000E+00 | 5.72932E−06 | D6 −1.21474E−08 | 6.29186E−09 |
| Reflecting surface 5a of polygon mirror - Incidence surface 6a of lens 6 | d1 | 10.50 | D8 0.00000E+00 | −9.37297E−09 | D8 2.14803E−11 | −4.13362E−12 |
| Incidence surface 6a of lens 6 - Emergence surface 6b of lens 6 | d2 | 6.50 | D10 0.00000E+00 | 0.00000E+00 | D10 0.00000E+00 | 1.05481E−15 |
| Emergence surface 6b of lens 6 - Incidence surface 7a of lens 7 | d3 | 7.12 | | | | |
| Incidence surface 7a of lens 7 - Emergence surface 7b of lens 7 | d4 | 6.60 | | | | |
| Emergence surface 7b of lens 7 - Scanned surface 8 | d5 | 103.28 | | | | |

| | | | Opposite side of light source | Opposite side of light source | Opposite side of light source | Opposite side of light source |
|---|---|---|---|---|---|---|
| Effective scanning width | W | 214.00 | Rs −1.16033E+01 | −2.99977E+01 | Rs −7.88803E+01 | −1.00571E+01 |
| k/W | k/W | 0.51 | D2 −9.72676E−05 | −1.03896E−02 | D2 0.00000E+00 | 1.77203E−03 |
| Reflecting surface 5a of polygon minor - Scanned surface 8 | L | 134.00 | D4 −7.39144E−06 | 8.82172E−05 | D4 0.00000E+00 | −4.56816E−06 |
| L/W | d/W | 0.63 | D6 0.00000E+00 | −3.60050E−07 | D6 0.00000E+00 | 6.29186E−09 |
| Reflecting surface 5a of polygon mirror- Last lens surface (7b) | d | 30.72 | D8 0.00000E+00 | 5.30588E−10 | D8 0.00000E+00 | −4.13362E−12 |
| d/W | d/W | 0.14 | D10 0.00000E+00 | 0.00000E+00 | D10 0.00000E+00 | 1.05481E−15 |
| d/L | d/L | 0.23 | | | | |
| Reflecting surface 5a of polygon mirror - Converging point | S | ∞ | | | | |
| S/k | S/k | ∞ | | | | |
| Power of fθ lens system 9 in main scanning direction | φm | 0.00923 | | | | |
| Power of lens 6 in main scanning direction | φ1 m | 0.00898 | | | | |
| Power of lens 7 in main scanning direction | φ2 m | 3.03E−06 | | | | |
| φ1 m/φm | | 0.974 | | | | |
| Power of fθ lens system 9 in sub scanning direction | φs | 0.04532 | | | | |
| Power of lens 6 in sub scanning direction- | φ1 s | −0.02434 | | | | |
| Power of lens 7 in sub scanning direction | φ2 s | 0.04698 | | | | |
| φs1/φs2 | | −0.518 | | | | |

TABLE 3

Construction of Optical Scanning Apparatus

| fθ coefficient | | | Meridional shape of fθ lens 6 | | | Meridional shape of fθ lens 7 | |
|---|---|---|---|---|---|---|---|
| fθ coefficient Wavelength & Refractive index | k | 109 | First surface 6a Light source side | Second surface 6b Light source side | | First surface 7a Light source side | Second surface 7b Light source side |
| Wavelength used | λ (nm) | 780 | R | −2.64814E+01 | −1.97526E+01 | R | 8.47991E+01 | 8.25696E+01 |
| Refractive index of fθ lens 6a | N1 | 1.5242 | K | −1.49902E+00 | −8.11549E−01 | K | −8.42997E+00 | −8.26049E−01 |
| Refractive index of fθ lens 6b | N2 | 1.5242 | B4 | 2.62745E−05 | 1.30249E−05 | B4 | −1.54001E−05 | −2.19243E−05 |
| Disposition of imaging optical system | | | B6 | −5.63823E−08 | 3.59039E−08 | B6 | 1.37412E−08 | 2.45322E−08 |
| Reflecting surface 5a of polygon mirror - Incidence surface 6a of lens 6 | d1 | 10.50 | B8 | 0.00000E+00 | −9.03558E−11 | B8 | −2.69944E−12 | −2.67301E−11 |
| Incidence surface 6a of lens 6 - Emergence surface 6b of lens 6 | d2 | 6.50 | B10 | 0.00000E+00 | 0.00000E+00 | B10 | −2.15513E−15 | 2.10166E−14 |
| Emergence surface 6b of lens 6 - Incidence surface 7a of lens 7 | d3 | 7.12 | B12 | 0.00000E+00 | 0.00000E+00 | B12 | 7.93243E−19 | −8.35950E−18 |
| Incidence surface 7a of lens 7 - Emergence surface 7b of lens 7 | d4 | 6.60 | B14 | 0.00000E+00 | 0.00000E+00 | B14 | 0.00000E+00 | 1.04822E−21 |
| Emergence surface 7b of lens 7 - Scanned surface 8 | d5 | 103.28 | B16 | 0.00000E+00 | 0.00000E+00 | B16 | 0.00000E+00 | 0.00000E+00 |

| | | | | Opposite side of light source | Opposite side of light source | | Opposite side of light source | Opposite side of light source |
|---|---|---|---|---|---|---|---|---|
| Effective scanning width | W | 214.00 | R | −2.64814E+01 | −1.97526E+01 | R | 8.47991E+01 | 8.25696E+01 |
| k/W | k/W | 0.51 | K | −1.49902E+00 | −8.11549E−01 | K | −8.42997E+00 | −8.26049E−01 |
| Reflecting surface 5a of polygon mirror - Scanned surface 8 | L | 134.00 | B4 | 2.62745E−05 | 1.22213E−05 | B4 | −1.71719E−05 | −2.31502E−05 |
| L/W | L/W | 0.63 | B6 | −5.63823E−08 | 4.20274E−08 | B6 | 1.72463E−08 | 2.67547E−08 |
| Reflecting surface 5a of polygon mirror- Last lens surface (7b) | d | 30.72 | B8 | 0.00000E+00 | −9.98223E−11 | B8 | −4.67025E−12 | −2.92126E−11 |
| d/W | d/W | 0.14 | B10 | 0.00000E+00 | 0.00000E+00 | B10 | −1.99776E−15 | 2.29436E−14 |
| d/L | d/L | 0.23 | B12 | 0.00000E+00 | 0.00000E+00 | B12 | 7.71718E−19 | −8.50899E−18 |
| Reflecting surface 5a of polygon mirror - Converging point | S | ∞ | B14 | 0.00000E+00 | 0.00000E+00 | B14 | 0.00000E+00 | 6.12529E−22 |
| S/k | S/k | ∞ | B16 | 0.00000E+00 | 0.00000E+00 | B16 | 0.00000E+00 | 0.00000E+00 |

| fθ coefficient | | | Sagittal shape of fθ lens 6 | | | Sagittal shape of fθ lens 7 | |
|---|---|---|---|---|---|---|---|
| fθ coefficient Wavelength & Refractive index | k | 109 | First surface 6a Light source side | Second surface 6b Light source side | | First surface 7a Light source side | Second surface 7b Light source side |
| Wavelength used | λ (nm) | 780 | Rs | −1.00000E+01 | −2.60656E+01 | Rs | −1.10562E+02 | −1.02891E+01 |
| Refractive index of fθ lens 6a | N1 | 1.5242 | D2 | 2.17817E−02 | 2.79669E−02 | D2 | 2.93772E−02 | 1.29294E−03 |
| Refractive index of fθ lens 6b | N2 | 1.5242 | D4 | −3.01306E−05 | 2.74043E−04 | D4 | −3.39852E−05 | −2.66668E−06 |
| Disposition of imaging optical system | | | D6 | 0.00000E+00 | −4.51031E−06 | D6 | 4.76228E−09 | 3.08203E−09 |
| Reflecting surface 5a of polygon mirror - Incidence surface 6a of lens 6 | d1 | 10.50 | D8 | 0.00000E+00 | 2.06592E−08 | D8 | 6.83372E−12 | −1.66146E−12 |
| Incidence surface 6a of lens 6 - Emergence surface 6b of lens 6 | d2 | 6.50 | D10 | 0.00000E+00 | 0.00000E+00 | D10 | 0.00000E+00 | 3.33698E−16 |
| Emergence surface 6b of lens 6 - Incidence surface 7a of lens 7 | d3 | 7.12 | | | | | | |
| Incidence surface 7a of lens 7 - Emergence surface 7b of lens 7 | d4 | 6.60 | | | | | | |
| Emergence surface 7b of lens 7 - Scanned surface 8 | d5 | 103.28 | | | | | | |

TABLE 3-continued

| | | | | | | | | |
|---|---|---|---|---|---|---|---|---|
| | | | | Construction of Optical Scanning Apparatus | | | | |
| | | | | Opposite side of light source | Opposite side of light source | | Opposite side of light source | Opposite side of light source |
| Effective scanning width | W | 214.00 | Rs | −1.00000E+01 | −2.60656E+01 | Rs | −1.10562E+02 | −1.02891E+01 |
| k/W | k/W | 0.51 | D2 | 0.00000E+00 | −1.09489E−02 | D2 | −1.63883E−04 | 1.93567E−03 |
| Reflecting surface 5a of polygon mirror - Scanned surface 8 | L | 134.00 | D4 | 0.00000E+00 | 1.07197E−04 | D4 | −2.01677E−08 | −5.17494E−06 |
| L/W | d/W | 0.63 | D6 | 0.00000E+00 | −4.94982E−07 | D6 | −1.68967E−10 | 7.03700E−09 |
| Reflecting surface 5a of polygon mirror- Last lens surface (7b) | d | 30.72 | D8 | 0.00000E+00 | 8.40679E−10 | D8 | 2.40767E−13 | −4.20847E−12 |
| d/W | d/W | 0.14 | D10 | 0.00000E+00 | 0.00000E+00 | D10 | 0.00000E+00 | 7.80384E−16 |
| d/L | d/L | 0.23 | | | | | | |
| Reflecting surface 5a of polygon mirror - Converging point | S | ∞ | | | | | | |
| S/k | S/k | ∞ | | | | | | |
| Power of fθ lens system 9 in main scanning direction | φm | 0.00923 | | | | | | |
| Power of lens 6 in main scanning direction | φ1 m | 0.00898 | | | | | | |
| Power of lens 7 in main scanning direction | φ2 m | 3.03E−06 | | | | | | |
| φ1 m/φm | | 0.974 | | | | | | |
| Power of fθ lens system 9 in sub scanning direction | φs | 0.04549 | | | | | | |
| Power of lens 6 in sub scanning direction | φ1 s | −0.02781 | | | | | | |
| Power of lens 7 in sub scanning direction | φ2 s | 0.04725 | | | | | | |
| φ s1/φ s2 | | −0.589 | | | | | | |

TABLE 4

| | | | | | | | |
|---|---|---|---|---|---|---|---|
| | | | | Construction of Optical Scanning Apparatus | | | |
| fθ coefficient | | | Meridional shape of fθ lens 6 | | Meridional shape of fθ lens 7 | | |
| fθ coefficient Wavelength & Refractive index | k | 109 | First surface 6a Light source side | Second surface 6b Light source side | | First surface 7a Light source side | Second surface 7b Light source side |
| Wavelength used | λ (nm) | 780 | R | −2.93818E+01 | −2.03902E+01 | R | 1.81175E+02 | 1.09124E+02 |
| Refractive index of fθ lens 6a | N1 | 1.5242 | K | 1.56127E+00 | −4.58105E−01 | K | 3.30200E+00 | −2.67018E+00 |
| Refractive index of fθ lens 6b | N2 | 1.5242 | B4 | 3.46799E−06 | 5.23719E−06 | B4 | −1.40815E−05 | −2.05919E−05 |
| Disposition of imaging optical system | | | B6 | −3.88326E−08 | 4.24069E−09 | B6 | 1.39028E−08 | 2.40423E−08 |
| Reflecting surface 5a of polygon mirror - Incidence surface 6a of lens 6 | d1 | 10.50 | B8 | −1.69126E−11 | −1.03668E−10 | B8 | −2.70376E−12 | −2.57935E−11 |
| Incidence surface 6a of lens 6 - Emergence surface 6b of lens 6 | d2 | 6.50 | B10 | 0.00000E+00 | −4.50920E−14 | B10 | −2.01028E−15 | 2.08929E−14 |
| Emergence surface 6b of lens 6 - Incidence surface 7a of lens 7 | d3 | 7.00 | B12 | 0.00000E+00 | 0.00000E+00 | B12 | 7.98511E−19 | −8.21491E−18 |
| Incidence surface 7a of lens 7 - Emergence surface 7b of lens 7 | d4 | 6.00 | B14 | 0.00000E+00 | 0.00000E+00 | B14 | 0.00000E+00 | 1.04920E−21 |
| Emergence surface 7b of lens 7 - Scanned surface 8 | d5 | 100.00 | B16 | 0.00000E+00 | 0.00000E+00 | B16 | 0.00000E+00 | 0.00000E+00 |
| | | | | Opposite side of light source | Opposite side of light source | | Opposite side of light source | Opposite side of light source |
| Effective scanning width | W | 214.00 | R | −2.93818E+01 | −2.03902E+01 | R | 1.81175E+02 | 1.09124E+02 |
| k/W | k/W | 0.51 | K | 1.56127E+00 | −4.58105E−01 | K | 3.30200E+00 | −2.67018E+00 |
| Reflecting surface 5a of polygon mirror - Scanned surface 8 | L | 130.00 | B4 | 3.46799E−06 | 3.80632E−06 | B4 | −1.65397E−05 | −2.20596E−05 |
| L/W | d/W | 0.61 | B6 | −3.88326E−08 | 1.57616E−08 | B6 | 1.75643E−08 | 2.59829E−08 |

TABLE 4-continued

Construction of Optical Scanning Apparatus

| | | | | | | | | |
|---|---|---|---|---|---|---|---|---|
| Reflecting surface 5a of polygon mirror - Last lens surface (7b) | d | 30.00 | B8 | −1.69126E−11 | −1.35127E−10 | B8 | −5.08980E−12 | −2.83873E−11 |
| d/W | d/W | 0.14 | B10 | 0.00000E+00 | −8.61470E−15 | B10 | −1.97081E−15 | 2.26898E−14 |
| d/L | d/L | 0.23 | B12 | 0.00000E+00 | 0.00000E+00 | B12 | 7.43665E−19 | −8.49511E−18 |
| Reflecting surface 5a of polygon mirror - Converging point | S | 751.00 | B14 | 0.00000E+00 | 0.00000E+00 | B14 | 0.00000E+00 | 5.13604E−22 |
| S/k | S/k | 6.89 | B16 | 0.00000E+00 | 0.00000E+00 | B16 | 0.00000E+00 | 0.00000E+00 |

| | fθ coefficient | | | Sagittal shape of fθ lens 6 | | | Sagittal shape of fθ lens 7 | |
|---|---|---|---|---|---|---|---|---|
| fθ coefficient | k | 109 | | First surface 6a Light source side | Second surface 6b Light source side | | First surface 7a Light source side | Second surface 7b Light source side |
| Wavelength & Refractive index | | | | | | | | |
| Wavelength used | λ (nm) | 780 | Rs | −1.00000E+01 | −3.40487E+01 | Rs | −1.45384E+02 | −1.01586E+01 |
| Refractive index of fθ lens 6a | N1 | 1.5242 | D2 | 1.25034E−02 | 2.44316E−02 | D2 | 2.70772E−02 | 1.13893E−03 |
| Refractive index of fθ lens 6b | N2 | 1.5242 | D4 | −1.59847E−05 | 3.01254E−04 | D4 | −3.78298E−05 | −2.39698E−06 |
| Disposition of imaging optical system | | | D6 | 0.00000E+00 | −5.09022E−06 | D6 | 4.83905E−09 | 2.94221E−09 |
| Reflecting surface 5a of polygon mirror - Incidence surface 6a of lens 6 | d1 | 10.50 | D8 | 0.00000E+00 | 3.02969E−08 | D8 | 6.44567E−12 | −1.53647E−12 |
| Incidence surface 6a of lens 6 - Emergence surface 6b of lens 6 | d2 | 6.50 | D10 | 0.00000E+00 | 0.00000E+00 | D10 | 0.00000E+00 | 2.47019E−16 |
| Emergence surface 6b of lens 6 - Incidence surface 7a of lens 7 | d3 | 7.00 | | | | | | |
| Incidence surface 7a of lens 7 - Emergence surface 7b of lens 7 | d4 | 6.00 | | | | | | |
| Emergence surface 7b of lens 7 - Scanned surface 8 | d5 | 100.00 | | | | | | |

| | | | | Opposite side of light source | Opposite side of light source | | Opposite side of light source | Opposite side of light source |
|---|---|---|---|---|---|---|---|---|
| Effective scanning width | W | 214.00 | Rs | −1.00000E+01 | −3.40487E+01 | Rs | −1.45384E+02 | −1.01586E+01 |
| k/W | k/W | 0.51 | D2 | 0.00000E+00 | −1.19444E−02 | D2 | −2.78396E−04 | 1.73652E−03 |
| Reflecting surface 5a of polygon mirror - Scanned surface 8 | L | 130.00 | D4 | 0.00000E+00 | 1.19052E−04 | D4 | −2.23986E−08 | −4.63401E−06 |
| L/W | d/W | 0.61 | D6 | 0.00000E+00 | −5.55955E−07 | D6 | −3.02581E−10 | 6.45127E−09 |
| Reflecting surface 5a of polygon mirror- Last lens surface (7b) | d | 30.00 | D8 | 0.00000E+00 | 9.55402E−10 | D8 | 7.69750E−14 | −3.98875E−12 |
| d/W | d/W | 0.14 | D10 | 0.00000E+00 | 0.00000E+00 | D10 | 0.00000E+00 | 7.35411E−16 |
| d/L | d/L | 0.23 | | | | | | |
| Reflecting surface 5a of polygon mirror - Converging point | S | 751.00 | | | | | | |
| S/k | S/k | 6.89 | | | | | | |
| Power of fθ lens system 9 in main scanning direction | φm | 0.00807 | | | | | | |
| Power of lens 6 in main scanning direction | φ1 m | 0.00982 | | | | | | |
| Power of lens 7 in main scanning direction | φ2 m | −1.86E−03 | | | | | | |
| φ1 m/φm | | 1.218 | | | | | | |
| Power of fθ lens system 9 in sub scanning direction | φs | 0.04432 | | | | | | |
| Power of lens 6 in sub scanning direction | φ1 s | −0.03358 | | | | | | |
| Power of lens 7 in sub scanning direction | φ2 s | 0.04873 | | | | | | |
| φs1/φs2 | | −0.689 | | | | | | |

What is claimed is:

1. An optical scanning apparatus comprising:

incidence optical means for causing a beam emitted from light source means to be incident on deflecting means; and scanning optical means for causing the beam reflected and deflected by the deflecting means to be imaged on a surface to be scanned, wherein said scanning optical means has a first lens on the deflecting means side, and has a second lens on the surface to be scanned side, wherein each of the first and second lenses comprises a toric lens of which both surfaces have toric surfaces, wherein the first lens has negative power in the sub-scanning direction, and the second lens has positive power in the sub-scanning direction, and wherein when the radius of curvature of the surface of the first lens which faces the deflecting means in the main scanning direction and the radius of curvature thereof in the sub-scanning direction are defined as R1m and R1s, respectively, the radius of curvature of the surface of the first lens which faces the surface to be scanned in the main scanning direction and the radius of curvature thereof in the sub-scanning direction are defined as R2m and R2s, respectively, the radius of curvature of the surface of the second lens which faces the deflecting means in the main scanning direction and the radius of curvature thereof in the sub-scanning direction are defined as R3m and R3s, respectively, and the radius of curvature of the surface of the second lens which faces the surface to be scanned in the main scanning direction and the radius of curvature thereof in the sub-scanning direction are defined as R4m and R4s, respectively, R1m<R2m<0<R4m<R3m;

R2s<R1s<0;

R3s<R4s<0;

R1m<R1s<0;

R2s<R2m<0; and

|R4s|<R4m.

2. An optical scanning apparatus comprising:

incidence optical means for causing a beam emitted from light source means to be incident on deflecting means; and scanning optical means for causing the beam reflected and deflected by the deflecting means to be imaged on a surface to be scanned, wherein said scanning optical means has a first lens on the deflecting means side, and has a second lens on the surface to be scanned side, wherein each of the first and second lenses comprises a toric lens of which both surfaces have toric surfaces, wherein the first lens has negative power in the sub-scanning direction, and the second lens has positive power in the sub-scanning direction, and wherein when the fθ coefficient of said scanning optical means is defined as k and the effective scanning width thereof is defined as W, $k/W \leq 0.6$.

3. An optical scanning apparatus comprising:

incidence optical means for causing a beam emitted from light source means to be incident on deflecting means; and scanning optical means for causing the beam reflected and deflected by the deflecting means to be imaged on a surface to be scanned, wherein said scanning optical means has a first lens on the deflecting means side, and has a second lens on the surface to be scanned side, wherein each of the first and second lenses comprises a toric lens of which both surfaces have toric surfaces, wherein the first lens has negative power in the sub-scanning direction, and the second lens has positive power in the sub-scanning direction, and wherein when the distance from the deflecting surface of the deflecting means to the surface to be scanned is defined as L and the effective scanning width is defined as W, $L/W \leq 0.8$.

4. An optical scanning apparatus according to any one of claims 1, 2 and 3, wherein the first lens and the second lens are disposed more adjacent to the deflecting means than to the midpoint of the distance from the deflecting surface of the deflecting means to the surface to be scanned.

5. An optical scanning apparatus according to any one of claims 1, 2 and 3, wherein when the power of the first lens in the sub-scanning direction is defined as $\phi 1s$ and the power of the second lens in the sub-scanning direction is defined as $\phi 2s$, $-0.8 \leq \phi 1s/\phi 2s \leq -0.4$.

6. An optical scanning apparatus according to any one of claims 1, 2 and 3, wherein when the power of the first lens in the main scanning direction is defined as $\phi 1m$, the power of the first lens in the sub-scanning direction is defined as $\phi 1s$, the power of the second lens in the main scanning direction is defined as $\phi 2m$ and the power of the second lens in the sub-scanning direction is defined as $\phi 2s$, $\phi 1s < \phi 2m < \phi 1m < \phi 2s$.

7. An optical scanning apparatus according to any one of claims 1, 2, and 3, wherein when the power of the first lens in the main scanning direction is defined as $\phi 1m$, the power of the first lens in the sub-scanning direction is defined as $\phi 1s$, the power of the second lens in the main scanning direction is defined as $\phi 2m$, and the power of the second lens in the sub-scanning direction is defined as $\phi 2s$, $|\phi 2m| < |\phi 1m| < |\phi 1s| < |\phi 2s|$.

8. An optical scanning apparatus according to any one of claims 1, 2 and 3, wherein the effective end portions of all surfaces of the first and second lenses are displaced more toward the deflecting means than the surface vertexes of the lenses.

9. An optical scanning apparatus according to claim 1, wherein when the distance from the deflecting surface of the deflecting means to the surface of the second lens which faces the surface to be scanned is defined as d and the effective scanning width is defined as W, $d/W \leq 0.2$.

10. An optical scanning apparatus according to claim 1 or 2, wherein when the distance from the deflecting surface of the deflecting means to the surface of the second lens which faces the surface to be scanned is defined as d and the distance from the deflecting surface of the deflecting means to the surface to be scanned is defined as L, $d/L \leqq 0.25.$ 11. An image forming apparatus comprising:
    an optical scanning apparatus according to any one of claims 1, 2 and 3;
    a photosensitive member disposed on the surface to be scanned;
    a developing device for developing an electrostatic latent image formed on said photosensitive member by the beam scanned by said optical scanning apparatus as a toner image;
    a transferring device for transferring the developed toner image to a transfer material; and
    a fixing device for fixing the transferred toner image on the transfer material.

12. An image forming apparatus comprising:
    an optical scanning apparatus according to any one of claims 1, 2 and 3; and
    a printer controller for converting code data inputted from an external device into an image signal and inputting the image signal to said optical scanning apparatus.

13. An optical scanning apparatus according to claim 2 or 3, wherein when the distance from the deflecting surface of the deflecting means to the surface of the second lens which faces the surface to be scanned is defined as d, $d/W \leqq 0.2.$ 14. An optical scanning apparatus according to claim 3, wherein when the distance from the deflecting surface of the deflecting means to the surface of the second lens which faces the surface to be scanned is defined as d, $d/L \leqq 0.25.$

* * * * *

UNITED STATES PATENT AND TRADEMARK OFFICE
CERTIFICATE OF CORRECTION

PATENT NO. : 7,057,781 B2  Page 1 of 1
APPLICATION NO. : 11/133396
DATED : June 6, 2006
INVENTOR(S) : Ishihara It is certified that error appears in the above-identified patent and that said Letters Patent is hereby corrected as shown below:

COLUMN 6:
Line 37, "defecting" should read --deflecting--.

COLUMN 19:
Line 19, "the" (first occurrence) should read --then--.
Line 27, "surface" (first occurrence) should read --surfaces--.

COLUMN 20:
Line 32, "$\phi 100s/\phi 2s=-0.519$," should read --$\phi 1s/\phi 2s=-0.519$,--.

COLUMN 27:
Line 63, "FIG. 1C," should read --FIG. 11C,--.

COLUMN 30:
Line 57, "a" should read --an--.

Signed and Sealed this

Twenty-ninth Day of April, 2008

JON W. DUDAS
*Director of the United States Patent and Trademark Office*